(12) United States Patent
Goodell et al.

(10) Patent No.: US 7,396,974 B2
(45) Date of Patent: Jul. 8, 2008

(54) OXIDATION USING A NON-ENZYMATIC FREE RADICAL SYSTEM MEDIATED BY REDOX CYCLING CHELATORS

(75) Inventors: Barry S. Goodell, Bangor, ME (US); Jody L. Jellison, Bangor, ME (US)

(73) Assignee: University of Maine, Orono, ME (US)

( * ) Notice: Subject to any disclaimer, the term of this patent is extended or adjusted under 35 U.S.C. 154(b) by 319 days.

(21) Appl. No.: 10/360,052

(22) Filed: Feb. 5, 2003

(65) Prior Publication Data

US 2003/0186036 A1    Oct. 2, 2003

Related U.S. Application Data

(60) Provisional application No. 60/355,265, filed on Feb. 8, 2002.

(51) Int. Cl.
    *A62D 3/00* (2007.01)
(52) U.S. Cl. ...................................... 588/315
(58) Field of Classification Search ................. 156/325, 156/326, 330, 335; 588/315, 320, 318
    See application file for complete search history.

(56) References Cited

U.S. PATENT DOCUMENTS

| | | | |
|---|---|---|---|
| 2,388,487 A | 11/1945 | Linzell | |
| 4,007,312 A | 2/1977 | Stofko et al. | |
| 4,087,318 A * | 5/1978 | Samuelson et al. | 162/60 |
| 4,432,921 A | 2/1984 | Haars et al. | |
| 5,266,214 A | 11/1993 | Safarzedeh-Amiri | |
| 5,268,141 A | 12/1993 | Ototani et al. | |
| 5,356,539 A | 10/1994 | Peter et al. | |
| 5,470,614 A * | 11/1995 | Chen et al. | 427/440 |
| 5,525,008 A | 6/1996 | Wilson | |
| 5,716,528 A | 2/1998 | Jasim et al. | |
| 6,046,375 A | 4/2000 | Goodell et al. | |
| 6,258,207 B1 * | 7/2001 | Pan | 162/27 |
| 6,287,708 B1 | 9/2001 | Viikari et al. | |

FOREIGN PATENT DOCUMENTS

WO    WO 96/03546 A1    2/1990

OTHER PUBLICATIONS

Azmi et al., "Biodegradation of triphenylmethane dyes", *Enzyme and Microbial Technology* 22: 185-191 (1998), no month.
Banat et al., "Microbial Decolorization of Textile-Dye-Containing Effluents: A Review", *Bioresource Technology* 58: 217-227 (1996), no month.
Cao, "Characterization of an extracellular azo dye-oxidizing peroxidase from *Flavobacterium* sp. ATCC 39723", *Enzyme Microb. Technol.*, 15: 810-817 (1993), no month.
Eisenhauer, "Oxidation of Phenolic Wastes", *Journal WPCF* 36:9. 1116-1128 (1964), no month.
Felby et al., "Identification and quantification of radical reaction intermediates by electron spin resonance spectrometry of laccase-catalyzed oxidation of wood fibers from beech (*Fagus sylvatica*)", *Appl Microbiol Biotechnol* 48: 459-464 (1997), no month.
Gierer, "Basic Principles of Bleaching, Part 2. Anionic Processes", *Holzforschung* 44:6: 395-400 (1990), no month.
Goodell et al , "Low molecular weight chelators and phenolic compounds isolated from wood decay fungi and their role in the fungal biodegradation of wood", *Journal of Biotechnology* 53: 133-162 (1997), no month.
Haber et al., "The Catalytic Decomposition of Hydrogen Peroxide by Iron Salts", *Proc. R. Soc. London* 147:332-351 (1934), no month.
Hosono et al., "Decoloration and Degradation of Azo Dye in Aqueous Solution Supersaturated with Oxygen by Irradiation of High-energy Electron Beams", *Appl. Radiat. Isot.* 44:9: 1199-1203 (1993), no month.
Hyde et al., "A mechanism for production of hydroxyl radicals by the brown-rot fungus *Coniophora puteana* Fe(III) reduction by cellobiose dehydrogenase and Fe(II) oxidation at a distance from the hyphas", *Microbiology* 143: 259-266 (1997), no month.
Kharazipour et al., "Enzymatic activation of wood fibres as a means for the production of wood composites", *J. Adhesion Sci. Technol.* 11:3: 419-427 (1997), no month.
Koenings, "Production of Hydrogen Peroxide by Wood-Rotting Fungi in Wood and Its Correlation with Weight Loss, Depolymerization, and pH Changes", *Arch. Microbiol.* 99: 129-145 (1974), no month.
Koenigs, "Hydrogen Peroxide and Iron: A Microbial Cellulolytic System?", *Biotechnol. & Bioeng. Symp.* 5: 151-159 (1975), no month.
Nakagawa et al , "Characteristic Bleaching Profiles of Cyanine Dyes Depending on Active Oxygen Species in the Controlled Fenton Reaction", *Biol. Pharm. Bull.* 16 11 1061-1064 (1993), no month.
Namboodri et al., "Decolorizing Dyes with Chlorine and Ozone: Part I". American Dyestuff Reporter: Mar. 17-22, 1994.
Namboodri et al., "Decolorizing Dyes with Chlorine and Ozone: Part II", American Dyestuff Reporter: Apr. 17-26, 1994.
Palma et al.. "In Vitro Degradation of the Dye Poly R-478 by Crude and Semipurified Manganese Peroxidase", B103-105, Dept. of Chemical Engineering, University of Santiago de Compostela, E-15706, Spain, no date.
Paszczynski et al., New approach to improve degradation of recalcitrant azo dyes by *Streptomyces* spp and *Phanerochaete chrysosporium*. *Enzyme Microb. Technol.*, 13: 378-384 (1991), no month.
Perkins, "A Demonstration of Reuse of Spent Dyebath Water Following Color Removal with Ozone", *Textile Chemist and Colonist* 28:1: 31-37 (1995), no month.

(Continued)

Primary Examiner—Edward M. Johnson
(74) Attorney, Agent, or Firm—Townsend and Townsend and Crew LLP

(57) ABSTRACT

Methods for oxidizing organic compounds using hydroxyl radicals formed through redox cycling chelator-mediated Fenton chemistry are disclosed. The methods include generating a reactive oxygen species by contacting a redox cycling chelator with an oxygen containing oxidant and a transition metal species. By contacting the resulting reactive oxygen species with an organic compound, the organic compound is oxidized. The preferred transition metal species is a cationic transition metal, such as iron or copper. The disclosed methods may be used to degrade organic waste compounds and dyes, activate lignocellulosic materials for bonding and produce adhesive formulations.

18 Claims, 8 Drawing Sheets

OTHER PUBLICATIONS

Schmidt et al., "A Proposed Role for Oxalic Acid in Non-Enzymatic Wood Decay by Brown-Rot Fungi", *Proceedings of the Seventy-Seventh Annual Meeting of the American Wood-Preservers Association* Apr. 26-29, 1981, vol. 77.

Spadaro et al., "Research Communications: Hydroxyl Radical Mediated Degradation of Azo Dyes: Evidence for Benzene Generation", *Environ. Sci. Technol.* 28:7: 1389-1393 (1994), no month.

Strickland et al., "Declorization of Continuous Dyeing Wastewater by Ozonation", *Textile Chemist and Colorist* 27.5. 11-15 (1995), no month.

Wong et al., "Decolorization and Biodegradation of Methyl Red by *Klebsiella pneumoniae* RS-13", *Wat. Res.* 30:7: 1736-1744 (1996), no month.

Xu et al., "Mechanisms of wood degradation by brown-rot fungi: chelator-mediated cellulose degradation and binding of iron by cellulose". *Journal of Biotechnology* 87: 43-57 (2001), no month.

Yang et al., "Decolorization of Dyes Using UV/$H_2O_2$ Photochemical Oxidation", *Textile Chemist and Colorist* 30:4, 27-35 (1998), no month.

Young et al , "Ligninase-Catalysed Decolorization of Synthetic Dyes", *Wat. Res.* 31.5: 1187-1193 (1997), no month.

Wanpeng et al , "Application of Ferrous-Hydrogen Peroxide for the Treatment of H-Acid Manufacturing Process Wastewater", *Wat. Res.* 30.12. 2949-2954 (1996), no month.

\* cited by examiner

OXIDATION USING A NON-ENZYMATIC FREE RADICAL SYSTEM MEDIATED BY REDOX CYCLING CHELATORS

CROSS-REFERENCES TO RELATED APPLICATIONS

This application is a non-provisional of and claims the benefit of U.S. Provisional Application No. 60/355,265, filed Feb. 8, 2002. Each of these applications is incorporated by reference in their entirety and for all purposes.

FIELD OF THE INVENTION

This invention relates to a non-enzymatic method of oxidizing organic compounds mediated by a redox cycling-chelator system, which produces free radicals.

BACKGROUND OF THE INVENTION

Oxidation of organic compounds is of significant concern in many areas, including waste degradation, the manufacture of wood products, and the preparation of adhesive materials. Accordingly, significant effort has been expended to develop methods of oxidizing organic compounds. Low-cost, environmentally-friendly systems to effectively oxidize organic compounds are being sought. One approach has focused on the use of free-radicals. Free-radicals are typically highly energetic and unstable, and can oxidize a broad spectrum of compounds.

The generation of free-radicals by biological systems is known. Research by Koenigs on the action of "Fenton" reagents against cellulose and wood cell wall components suggested that iron and hydrogen peroxide were involved in the production of highly reactive hydroxyl radicals which could initiate the depolymerization of cellulose in wood as: $Fe^{2+}+H_2O_2 \rightarrow Fe^{3+}+HO \cdot +HO-$ ("Hydrogen peroxide and iron: a microbial cellulolytic system?" in *Cellulose as a Chemical and Energy Resource. Symposium 5, Biotechnology and Bioengineering*. Wilke, C. R. (Ed.), John Wiley and Sons, New York 5:151-159 (1975)). Hydroxyl radicals can also be generated in the presence of metals by the related Haber-Weiss reaction (Haber and Weiss, *Proc. R. Soc.*, 147: 332-351 (1934)) as: $O_2 \cdot{-} + H_2O_2 \rightarrow O_2 + HO- + HO \cdot$. This reaction is now known to occur via the superoxide reduction of iron with hydrogen peroxide oxidation of iron to produce hydroxyl radicals.

One potential application of free radical oxidation is the production of wood products. Lignin comprises as much as 40% of wood's mass. Lignin is composed of phenylpropane units linked by several forms of ether or carbon-carbon bonds (Sjöström and Eero, *Wood Chemistry*, Academic Press, Inc., San Diego, Calif., pp. 12, 13, 73-84 (1993)). Lignin's random and noncrystalline network structure makes it a very thermodynamically stable biopolymer (Glasser, W. G., *Forest Prod. J.*, 31(3):24-29 (1981)). The biosynthesis of lignin begins with phenylpropanoid precursors through an enzymatic oxidative coupling mechanism between free phenoxy radicals.

Bonding of lignocellulosic material is essential for the manufacture of a variety of wood products including particleboard, fiberboard, oriented strand board, laminated wood products, and plywood. In current commercial wood bonding processes, an adhesive is spread or sprayed on the surface of the material. The theories for adhesion between the adhesive and wood structure or its components include mechanical interlocking, diffusion, and adsorption or surface reaction (Pocius, A. V., *Adhesion and Adhesives Technology: An introduction*, Carl Hanser Verlag, Munich, Germany, pp. 118-130 (1997)). Procedures have been proposed to create such adhesion through formation of wood-to-wood chemical bonds, but have not met commercial acceptance. Non-enzymatic methods to promote autoadhesion between lignocellulosic materials have received much attention over the last century. Linzell et al. (U.S. Pat. No. 2,388,487 (1945)) patented the fabrication of compressed fiber composites through the use of a ferric compound, such as ferric sulfate, to facilitate a self-bonding mechanism of wood. Stofko et al. (U.S. Pat. No. 4,007,312 (1977)) patented a process for bonding lignocellulosic materials through the use of a liquid carrier and an oxidant with heat and pressure. In their system, white fir wood shavings with a moisture content of about 12% were sprayed with a solution containing hydrogen peroxide while another equal part of the shavings were sprayed with a catalyst solution of ferrous sulfate and hydrochloric acid. Then, equal amounts of the respective shavings sprayed with the reactants were mixed together and a conventional particle mat was formed. The mat was cold-pressed, hot-pressed, and then samples were tested for internal bond strength. The strength of the bond was comparable to the strength achieved by traditional adhesives.

Enzymatic systems to promote lignin activation and fiber bonding have also been proposed. For example, Kharazipour et al., *J. Adhesion Sci Tech.* 11(3): pp. 419-4217 (1997) and others (Haars, A. and Hutterman, A., U.S. Pat. No. 4,432,921 (1984); Felby et al., *Appl. Microbiol., Biotechnol.*, 48:459-464 (1997)) described a procedure for bonding wood fragments together in the manufacturing of a composite product. A commonality in their procedures for bonding wood fragments is the activation of the middle lamella lignin of the wood cell wall through incubation with phenol-oxidizing enzymes. Using this technique, molded products were created without additional bonding agents or chemicals. The chemical reactions involved in these self-bonding systems are not fully understood, but oxidative coupling of phenolic units contained in wood is either the main or at least one of the main reactions leading to autoadhesion of lignocellulosic materials (Stofko, J. and Zavarin, E., U.S. Pat. No. 4,007,312 (1977); Haars, A. and Hutterman, A., U.S. Pat. No. 4,432,921 (1984); Kharazipour et al., *J. Adhesion Sci. Technol.*, 11(3):419-427 (1997); Felby et al., *Appl. Microbiol. Biotechnol.*, 48:459-464 (1997)). Possibly, phenolic free radical formation and subsequent coupling occurs at precisely the time surfaces to be bonded are in close contact (Stofko, J. and Zavarin, E., U.S. Pat. No. 4,007,312 (1977)) (some polysaccharide-to-polysaccharide or lignin-to-polysaccharide bonding may also occur during the oxidation).

Certain brown-rot fungi, such as *Gloeophyllum trabeum*, secrete low molecular weight compounds, initially described as catecholate phenolics, that have been hypothesized to be involved in the degradation of wood (Koenigs, J. W., *Arch. Microbio.*, 99:129-145 (1974); Backa et al., *Holzforschung*, 46(1):61-67 (1992); Hyde et al., *Microbiology*, 143:259-266 (1997); Hirano et al., *Mokuzai Gakkaishi*, 41:334-341 (1995); Jellison et al., *App. Microbiol. Biotechnol.*, 35:805-809 (1991); Chandhoke et al., *FEMS Microbiol. Lett.*, 90:236-266 (1992); Goodell et al., *J. Biotech.*, 53:133-1 62 (1997); Paszczynski et al., 1999; Kerem et al., 1999; Xu et al., *J. Biotechnology*, 67:43-57 (2001)). The orthodihydroxy forms of these catecholate compounds have the capability to bind and reduce the oxidized (ferric) form of iron (Pracht et al., "Abiotic Fe(III) Induced Mineralization of Phenolic Substances", *Chemosphera*, in press (2001)). The reduced iron is then available to participate in Fenton reactions with hydrogen peroxide produced by wood-rotting fungi (Koenigs, J.

W., *Arch. Microbio.*, 99:129-145 (1974); Hyde et al., *Microbiology*, 143:259-266 (1997); (Haber et al., *Proc. R. Soc. London*, 147:332-351 (1934); Schimdt et al., *Am. Wood Preserver Assoc.*, 77:157-164 (1981)). The resulting highly reactive hydroxyl radicals may then initiate degradation of the wood cell wall through phenolic oxidation. Therefore, the chelators produced by the fungi likely play a role in non-enzymatic wood decay processes since enzymes have been shown to be too large for initial wood cell wall penetration (Flournoy et al., *Holzforschung*, 45: 383-388 (1991)).

Another potential application of free radical oxidation is in the preparation of adhesive materials. It is known that enzymatically oxidized lignin compounds may be used as wood adhesives (Viikari, et al., U.S. Pat. No. 6,287,708). More specifically, it has been postulated that the phenoxy radicals of lignocellulosic materials may provide adhesion to non-oxidized lignocellulosic materials. Components derived from annual plant materials, such as feruloylarabinoxylans, as well as oxidized phenolic polysaccharides can also be used as adhesives for lignocellulosic materials (Feldman et al., WO 96/03546).

Yet another potential application of free radical oxidation is in the degradation of waste products from leaking storage facilities or accidental or even purposeful discharge. The most common types of contaminants found at waste sites are aromatic and aliphatic organic compounds. Organic waste products may be derived from a wide variety of activities, including the manufacture of petroleum products, plastics, and wood products.

Aromatic and aliphatic organic compounds may be present in surface water as well as soil and groundwater. Especially problematic in groundwater and soil contamination are aromatic and aliphatic compounds refined from petroleum hydrocarbons such as gasoline, fuel oil, motor oil, polychlorinated biphenyl (PCB), benzene, toluene, ethyl benzene and xylene as well as organic monomeric waste compounds from the manufacture of plastics. Aromatic and aliphatic waste compounds include halogenated organic substances and solvents which may present a significant carcinogenic risk.

In-situ groundwater and soil remediative techniques using strong oxidizing agents, such as hydrogen peroxide are known. (Vigneri et al., U.S. Pat. No. 5,268,141; Wilson et al., U.S. Pat. No. 5,525,008; Peter et al., U.S. Pat. No. 5,356,539). Although these techniques are partially effective in degrading aromatic and aliphatic organic compounds are waste products, the oxidative techniques were limited because of the short half life of the hydroxyl radical intermediates.

Aromatic organic waste may also be produced, for example, from wood preservation treatment to produce products such as railway ties, telephone poles and marine pilings. Wood is treated with compounds such as creosote or chlorinated phenols such as pentachlorophenol. Degradation of aromatic organic waste from wood preservation treatments using ferrous iron salt and hydrogen peroxide is known. (Eisenhauer H. R., *Water Pollution Control Federation Journal*, 36(9): 1116-1128 (1964); Jasim et al., U.S. Pat. No. 5,716,528). However, the utility of these methods is limited by the short half life of the hydroxyl radicals.

Aromatic waste is also produced from the use of dyes. Dyes have been used increasingly in the textile and paper industry because of their cost effectiveness, stability and color variety. Currently, there are about 3,000 different dyes available on the commercial market. Among them, azo dyes are the largest class of dyes used in the industry. Other synthesized dyes include anthraquinone, triphenylmethane, and sulfur dyes etc. (Lubs, *The Chemistry of Synthetic Dyes and Pigments*, Hafner Publishing Co., Darien, Conn. (1970)). Although these dyes help make our world more colorful, the pollution problem caused by their release into the environment has received considerable attention.

To many textile and paper finishing plants, removing color from industrial effluents is a major issue in wastewater treatment. Biological treatment is a commonly used method, and biodegradation of dyes by anaerobic and aerobic microorganisms has been studied extensively during the past several decades (Chung et al., *Crit. Rev. Microbiol.*, 18:175-190 (1992)). Some commonly used microorganisms in dye biodegradation include bacteria, actinomycetes, yeasts, and fungi (Azmi et al., *Enzyme and Microbial Technology*, 22(2): 185-191 (1998); Banat et al., *Bioresource Technology*, 58: 217-227 (1997); Paszczynski et al., *Enzyme and Microbial Technology*, 13(5): 378-384 (1991); Wong et al., *Wat. Res.*, 30(7): 1736-1744 (1996)). Recently, many researchers have also concentrated on enzymatic systems responsible for the degradation and degradation of dyes during biotreatment (Cao et al., *Enzyme and Microbial Technology*, 15: 810-817 (1993); Young et al., *Wat. Res.*, 31(5): 1187-1193 (1997); Palma et al., *Symposium of 7th International Conference on Biotechnology in the Pulp and Paper Industry*, Vancouver, B103-105 (1998)). For the more resistant dyes, however, costly physical and/or chemical decolorizing processes are often the only available treatment alternatives. Physical and chemical techniques which have been explored for dye degradation include flocculation combined with flotation, electroflotation, membrane-filtration, ion-exchange, irradiation, precipitation, and adsorption etc. (Lin et al., *Wat. Res.*, 27: 1743-1748 (1993); Ulker et al., *J. Environ. Sci. Health*, A29: 1-16 (1994); Banat et al., (1996); Huang et al., *Am. Dyestuff Reporter*, 83: 15-18 (1994); Adams et al., *Ozone Sci. Engng.*, 17: 149-162 (1995)). Although these physical and/or chemical techniques have been shown to be effective with some specific dyes, they have significant shortcomings. Major disadvantages include: costly equipment requirements and operation expenses; large amounts of sludge generated in certain processes; excess amount of chemical usage; low efficiency color reduction; and sensitivity to variable input streams (Banat et al., 1996).

Other approaches to the degradation of dyes involve chemical oxidation processes to remove color. Oxidative techniques are usually found in the literature to treat colored wastewater. Some commonly used chemical oxidants include chlorine and/or ozone (Namboodri et al., *American Dyestuff Reporter*, 3: 17-22 (1994); Namboodri et al., *American Dyestuff Reporter*, 4: 17-26 (1994); Perkins et al., *Textile Chemist and Colorist*, 27(1): 31-37 (1995); Strickland et al., *Textile Chemist and Colorist*, 27(5): 11-15, (1995)), UV irradiation with $H_2O_2$ (Hosono et al., *Appl. Radiat. Isot.*, 44(9): 1199-1203 (1993); Safarzedeh et al., U.S. Pat. No. 5,266,214 (1993); Yang et al., *Textile Chemist and Colorist*, 30(4): 27-35 (1998)), Fenton's reagent (Spadaro et al., *Environ. Sci. Technol.*, 28(7): 1389-1393 (1994); Zhu et al., *Wat. Res.*, 30(12): 2949-2954 (1996); Nakagawa, et al., *Biol. Pharm. Bull.*, 16(11): 1061-1064 (1993)) and combinations of these activators. Methods of degrading organic species via oxidative processes are known in the art. See Table 1.

Previous studies have shown that active oxygen species may play a major role in many or most dye oxidation processes. For some mills, certain oxidation treatment schemes may be applicable. None of these processes, however, is effective enough to be used commonly for mills or dye mixtures. In addition, none of these methods use a redox cycling chelator.

Free radicals, especially oxygen based radical species, are very active and strong oxidants that are capable of breaking down dye molecules. Nakagawa et al. studied the bleaching profiles of cyanine dyes exposed to a controlled Fenton reaction. They found under different conditions, hydroxyl radicals (.OH) and/or superoxide radicals (.$O_2^-$) were the primary radical responsible for the bleaching of cyanine dyes. However, these free radicals, especially the hydroxyl radical, usually have short lifetimes that limited their application. Safarzedeh described a mediated Fenton method, which employed the photolysis of ferric oxalate to keep generating Fe(II) for Fenton's reaction in the treatment of organic contaminants. The method, however, has some drawbacks such as the competitive UV absorption by byproducts, which reduced the efficiency of treatment and limited the concentration of contaminants that can be treated.

TABLE 1

Comparison of degradations based on active oxygen species

| PROCESS | Advantages | Disadvantages |
|---|---|---|
| NaOCl | Simple equipment and process rapid degradation | High toxicity<br>Salt formation |
| $O_3$ | Short reaction times<br>No salt and sludge formation | High equipment cost<br>Not applicable for all dye types<br>No COD reduction<br>Toxicity and hazard handling |
| UV/$H_2O_2$ | Short reaction time<br>Reduction of COD<br>No salt and sludge formation | Not applicable for all dye types<br>Relatively high energy and equipment cost<br>Limited production |
| Fenton | Simple equipment and easy operation<br>Reduction of COD (except with reactive dyes)<br>Increase of DO (dissolved oxygen) in water | Long reaction time<br>Salt and sludge formation |
| FSR* | Simple equipment and easy operation<br>Reduction of COD (except with reactive dyes)<br>Increase of DO (dissolved oxygen) in water | Salt formation<br>Gas formation during electrolysis |

*FSR: Fenton Sludge Recycling System is an oxidative degradation process applying Fenton reaction and a subsequent sludge recycling stage.

Therefore, there is a need to develop a novel, effective oxidation process for the degradation of aromatic and aliphatic organic compounds. In addition, there is a need in the art for a non enzymatic, chelator-mediated, free radical system (Goodell et al., *J. Biotech.*, 53: 133-1 62 (1997); Xu et al., *J. Biotech.*, 67, 43-57 (2001)) for oxidation of lignocellulosic material and formation of wood fiber composites, which promote a more environmentally friendly and less expensive alternative for bonding of wood in the wood composite industry. Finally, there is an additional need to develop a non-enzymatic method of producing an adhesive formulation by forming phenoxy radicals. Such methods for producing adhesives would be less expensive and more environmentally friendly than the alternative methods for producing adhesives from organic molecules. Surprisingly, the present invention meets these and other needs.

BRIEF SUMMARY OF THE INVENTION

It has now been discovered that a non-enzymatic, chelator-mediated, free radical system can be used to efficiently activate organic materials in an environmentally friendly manner. Prior to this invention, the application of hydroxyl radicals produced by Fenton reactions have been limited because of the short lifetimes of these radicals. The present invention extends the use of hydroxyl radicals to a variety of applications through the use of redox cycling chelators. Thus, the present invention provides a method of degrading aromatic and aliphatic organic compounds as well as dye compounds. Additionally, the free radical system of the present invention provides methods of producing adhesive formulations. Finally, the present invention may be used to oxidize lignocellulosic material and form wood fiber composites.

In one aspect of the invention, a method of oxidizing a lignocellulosic material is provided. The method comprises generating a reactive oxygen species by contacting a redox cycling chelator with an oxygen containing oxidant and a metal ion species. The resulting reactive oxygen species is contacted with the lignocellulosic material to from an oxidized lignocellulosic material.

Redox cycling chelators include, for example, hydroquinone, ethylenedinitrilo-tetraacetic acid (EDTA), catechol, quinoline (e.g., 8-hydroxy quinoline), hydroxyquinoline, dihydroxybenzene, trihydroxybenzene, dihydroxybenzoic acid (e.g., 3,4-dihydroxybenzoic acid), or substituted derivatives thereof. Preferably, the redox cycling chelator is a catecholate such as 2,3-dihydroxybenzene, a quinoline. Although redox cycling chelators may be derived from *Gloeophyllum* spp. or an undefined fraction of media in which *Gloeophyllum* spp. are cultured, commercially available redox cycling chelators are also of use in practicing the present invention.

In a further preferred embodiment, the redox cycling chelator is capable of being reduced after contacting an oxygen containing oxidant and a metal ion species. The reduced redox cycling chelator is then again contacted with an oxygen containing oxidant and a metal ion species to generate another reactive oxygen species.

Oxygen containing oxidants include, for example, hydrogen peroxide, hydroperoxide, peroxide, singlet oxygen, ozone, and permanganate.

Lignocellulosic materials include any class of substances containing lignocellulose.

In another aspect of the present invention, a method of forming a lignocellulosic material composite article is provided. The method comprises first oxidizing lignocellulosic material by a method consistent with the disclosed teachings of the current invention, followed by the application of heat and/or pressure.

In another aspect of the present invention, a lignocellulosic material composite article is provided. The lignocellulosic material composite article is formed by oxidizing lignocellulosic material by a method consistent with the disclosed teachings of the current invention, followed by the application of heat and/or pressure. Lignocellulosic material composite articles include but are not limited to wood products such as particleboard, fiberboard, oriented strand board, laminated wood products, and plywood as well as non lignocellulosic materials such as fiber reinforced polymers, plastics and metals. The lignocellulosic material composite articles may also comprise non-lignocellulosic materials in addition to lignocellulosic materials. These materials include, but are not limited to, fiber reinforced polymers, plastics (vinyls—PVC, melamines, polyethylenes, polypropylene), glass (fiberglass), metal, organic and inorganic waste products, ceramics, cement, stone products, arbon, aramids, kevlar, and composites of all or some of these materials together.

In another aspect of the present invention, a method of degrading an organic waste compound, which is generally not a halogenated phenolic and or a polysaccharide, is provided. The method comprises contacting the organic waste compound with a transition metal species, a redox cycling chelator and an oxygen containing oxidant to generate a reactive oxygen species capable of oxidizing the organic waste compound. The organic waste compound includes, but is not limited to, waste from the synthesis of industrial chemicals and compounds derived from a plant, e.g. lignocellulosic material.

In another aspect of the present invention, a method of degrading a dye is provided. The method comprises contacting the dye with a transition metal species, a redox cycling chelator and an oxygen containing oxidant to generate a reactive oxygen species capable of degrading the dye.

In another aspect of the present invention, a method of preparing an adhesive formulation is provided. The method comprises contacting a phenoxy subunit-containing organic compound with a transition metal species, a redox cycling chelator and an oxygen containing oxidant to generate a reactive oxygen species thereby preparing the adhesive formulation. Phenoxy subunit-containing organic compounds include, but are not limited to, compounds derived from a plant, e.g., lignocellulosic material.

In another aspect of the present invention, an adhesive formulation is provided. The adhesive formulation is prepared by contacting a phenoxy subunit-containing organic compound with a transition metal species, a redox cycling chelator and an oxygen containing oxidant to generate a reactive oxygen species thereby preparing the adhesive formulation. Phenoxy subunit-containing organic compounds include, but are not limited to, compounds derived from a plant and lignocellulosic material.

Other advantages, objects and aspects of the invention will be apparent from the detailed description that follows.

DESCRIPTION OF THE PREFERRED EMBODIMENT

Definitions

Figure 1:
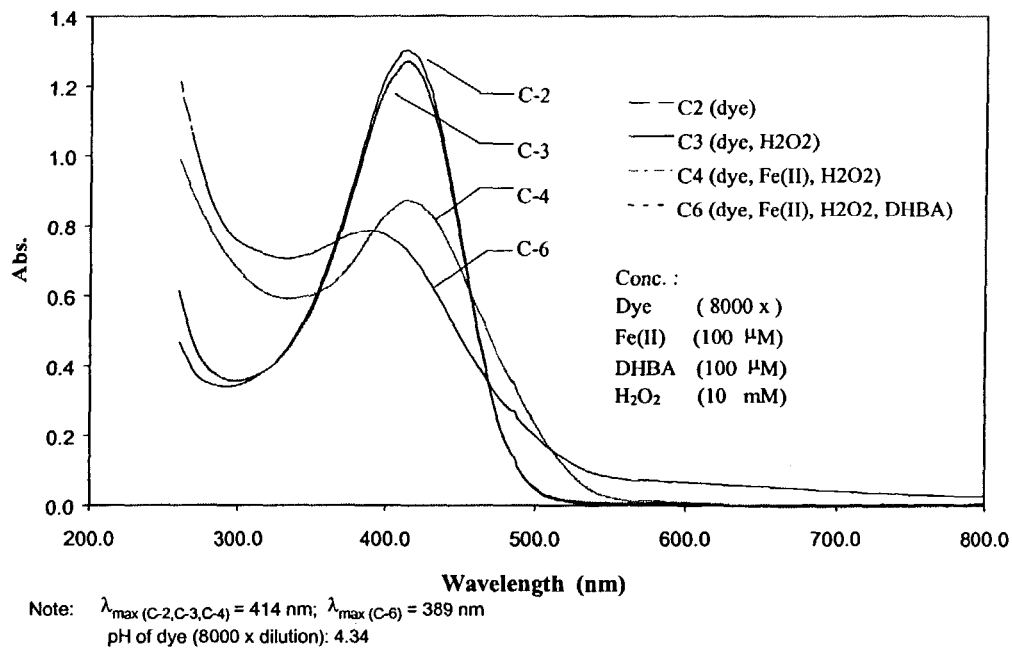
FIG. 1. An UV spectra showing the degradation of Carta yellow G dye after 1 minute incubation.

As used herein, "chelating" means a reversible interaction of a metallic ion with a molecule or ion to form a complex molecule, which has characteristics different from the original metallic ion.

As used herein, "buffer" means any chemical or biological substance capable of maintaining an approximately constant pH in a solution.

As used herein, "lignin" means a group of heterogeneous phenylpropane polymers such as those found in plants that form constituents of cell walls and are associated with cell wall polysaccharides.

As used herein, "phenylpropane polymer" and "phenylpropyl polymer" refer to any compound that comprises phenylpropane subunits.

As used herein, "phenylpropane" means any substituted or unsubstituted compound that comprises a benzene ring bonded to a propyl moiety. Thus, a "phenylpropane" includes chemical compositions with various substituents bonded to the phenyl and/or propyl moieties. By way of illustration, a "phenylpropane" may be a coniferyl alcohol, a sinapyl alcohol or a futoquinol.

As used herein, "lignocellulose" means a class of chemical compositions common in woody plant cell walls comprising cellulose, hemicellulose, lignin and extractives.

As used herein, "lignocellulosic material" means any class of substances containing lignocellulose.

As used herein, "lignocellulosic composite article" means any class of structures formed by oxidizing at least one lignocellulosic material and bonding the lignocellulosic material or materials together or to other lignocellulosic or non-lignocellulosic materials to form a single, coherent structure.

As used herein, "ion" means an electrically charged atom, molecule, or radical.

As used herein, "metal" refers to an element of the periodic table from columns IA (exclusive of Hydrogen), IIA, IB, IIB, IIIB-VIIB, VIII, IIIA (exclusive of Boron), IVA (exclusive of Carbon, Silicon, & Germanium), Antimony, Bismuth, and Polonium. In a preferred embodiment, the metal will be a transition metal (columns IB, and IIIB-VIII) or a post-transition metal (column IIB).

As used herein, "metal species" refers to any chemical compound comprising a metal ion.

As used herein, "transition metal" refers to an element from the B group of the periodic table.

As used herein, "transition metal species" refers to any chemical compound comprising a transition metal.

As used herein, "redox cycling chelator" means a composition, which is capable of chelating a metal ion and undergoing a redox reaction with the metal ion such that the metal ion is reduced and the redox chelator is oxidized. A redox cycling chelator can be in a reduced form such that it can reduce a chelated metal ion, or in an oxidized form, which may subsequently be reduced for further chelation and redox reaction with a metal ion.

As used herein, "oxygen containing oxidant" refers to an oxygen containing composition, which can increase the valence number of an ion or atom as the result of the loss, by the ion or atom, of one or more electrons, thereby making the ion or atom more electropositive.

As used herein, "reactive oxygen species" means a free-radical form of oxygen or an oxygen containing compound.

As used herein, "oxidizing" refers to the act of increasing the valency of an ion or atom as a result of the loss of one or more electrons.

As used herein "polyphenolic" refers to an aromatic or polyaromatic compound having at least two phenol groups.

As used herein, "polysaccharide" refers to carbohydrates containing at least two subunits derived from one or more simple sugars.

As used herein, "catechol" refers to any species that contains a phenyl moiety substituted with at least two hydroxyl groups, e.g. the isomeric 3,5,7,3',4'-pentahydroxyflavans, and the general class of flavan-3-ols.

As used herein, "*Gloeophyllum* spp." means a basidiomycetous fungus capable of producing brown rot in wood which is a member of the genus *Gloeophyllum* species in Stalpers, J. A., "Identification of wood-inhabiting *Aphyllophorales* in pure culture" in *Studies in Mycology No. 16*. Institute of the Royal Netherlands Academy of Arts and Sciences. Examples include *G. trabeum* and *G. sepiarium*.

As used herein, "organic waste compound" means any substituted or unsubstituted aliphatic or aromatic organic compound considered to be waste, a byproduct, or a pollutant.

As used herein, "aromatic organic compound" means any substituted or unsubstituted organic compound comprising an aromatic group. As used herein, aromatic groups may be heterocyclic or homocyclic and may be substituted or unsubstituted.

As used herein, "aliphatic organic compound" means any substituted or unsubstituted organic compound comprising an aliphatic group.

As used herein, "aliphatic group" means a substituted or unsubstituted non-aromatic organic group, e.g. a hydrocarbon. As used herein, "aliphatic group" includes branched hydrocarbon chains and chains containing elements other than hydrogen and carbon, e.g. heteroaliphatic.

As used herein, "phenoxy subunit" means a substituted or unsubstituted group comprising $C_6H5O.$, composed of a phenyl united with an oxygen. The phenoxy subunit may or may not be bonded to various other substituents.

As used herein, "phenoxy radical" means a phenoxy subunit comprising a free radical (i.e. an atom with at least one unpaired electron in the outermost shell).

As used herein, "dye" means one or more organic compounds designed to color an article. Dyes are well known in the art (Lubs, H. A., in *The Chemistry of Synthetic Dyes and Pigments*, Hafner Publishing Co., Darien, Conn. (1970)). Those skilled in the art will recognize that a "dye" includes, but is not limited to azo dyes, anthraquinone dyes, benzodifuranone dyes, polycyclic aromatic carbonyl dyes, indigoid dyes, polymethine and related dyes, styryl dyes, di- and triaryl carbonium and related dyes, phthalocyanines, quinophthalones, nitro and nitroso dyes and the like.

As used herein, "non-enzymatic method" means a method that is fully functional without mediation by an enzyme. One skilled in the art will understand that a method that is not mediated by an enzyme is not necessarily devoid of enzymes. In addition, the method is fully functional in the presence of an endogenous enzyme.

As used herein, "non-fungal method" means a method that is fully functional without mediation by a fungus. One skilled in the art will understand that a method that is not mediated by a fungus is not necessarily devoid of a fungus. In addition, the method is fully functional in the presence of an endogenous fungus.

Introduction

The present invention provides methods for activating organic species with hydroxyl radicals formed through redox cycling chelator-mediated Fenton chemistry.

The invention includes oxidizing a lignocellulosic material by generating a reactive oxygen species using redox cycling chelators which allow highly efficient radical generation via Fenton chemistry. The lignocellulosic material is oxidized when contacted with the reactive oxygen species.

The invention also includes a method of forming a lignocellulosic material composite material. This method comprises oxidizing lignocellulosic material by a method consistent with the disclosed teachings of the current invention and applying heat and/or pressure. Thus, the non-enzymatic method of oxidizing a lignocellulosic material can form a lignocellulosic material composite article.

The invention also includes a lignocellulosic material composite article produced by oxidizing lignocellulosic material by a method consistent with the disclosed teachings of the current invention and applying heat and/or pressure.

The invention also includes a lignocellulosic material oxidizing system. The system includes a redox cycling chelator, a metal ion species and an oxygen containing oxidant that generate reactive oxygen species, which oxidize lignocellulosic material.

The invention also includes a method of degrading an organic waste compound. This method includes oxidizing organic waste compounds by a method consistent the current invention. Thus, the non-enzymatic method of oxidizing a lignocellulosic material can degrade organic waste compounds.

The invention also includes a method of degrading a dye. This method includes oxidizing a dye by a method of the invention. Thus, the non-enzymatic method of oxidizing a lignocellulosic material can function to degrade a dye.

The invention also includes a method of preparing an adhesive formulation. This method includes oxidizing a phenoxy subunit-containing organic compound by a method of the invention. Thus, the non-enzymatic method of oxidizing a lignocellulosic material can function to prepare adhesive formulations.

The invention also includes an adhesive formulation. This method includes oxidizing a phenoxy subunit-containing organic compound by a method of the invention. Thus, the non-enzymatic method of oxidizing a lignocellulosic material can function to provide adhesive formulations.

The Methods

Oxidizing Lignocellulosic Material

In one aspect, the present invention is directed to forming a reactive oxygen species for use, for example, in industrial applications where free-radical production is required. Those of skill recognize that reactive oxygen species, such as superoxide anion, are potent reducing agents. Thus, formation of the reactive oxygen species may be used to effect an oxidation or reduction.

In another aspect, the invention is directed to a method of oxidizing a lignocellulosic material. The method comprises generating a reactive oxygen species by contacting a redox cycling chelator with an oxygen containing oxidant and a metal ion species, and further contacting the resulting reactive oxygen species with the lignocellulosic material to form the oxidized lignocellulosic material.

A redox cycling chelator of the present invention is preferably capable of binding and reducing a metal ion. As a result of the metal ion reduction, the redox cycling chelator is itself generally oxidized. The oxidized redox cycling chelator may optimally be reduced back to its reduced form where it is again capable of reducing a metal ion. In this manner, redox cycling chelators of use in the present invention are capable of cycling between reduced and oxidized states. The redox cycling chelator preferably has sufficient affinity with a metal ion to bind the metal ion and form a metal ion chelate complex.

In a preferred embodiment, a portion of the redox cycling chelator population mineralizes after being sufficiently oxidized. The oxidation and subsequent mineralization of this redox cycling chelator population provides reducing power to the non-mineralized redox cycling chelator population. The increased reducing power allows a greater proportion of metal ion to be reduced, thus facilitating the utility of the oxidation methods of the current invention.

Metal ions of use in the present invention are those that can generate a reactive oxygen species when contacted with a redox cycling chelator and an oxygen containing oxidant. The metal ions are generally able to be reduced by a redox-cycling chelator. Thus, the metal ions are generally transition metal ions. One of skill in the art will recognize that the utility of the oxidation method of the current invention is not significantly affected by the valence state of the transition metal. For example, both Fe(II) and Fe(III) may be used as the metal ion without affecting the utility of the present oxidation method because both metal ions can generate a reactive oxygen species by contacting a redox cycling chelator and an oxygen containing oxidant.

In a preferred embodiment, the metal ion is iron or copper.

In a particularly preferred embodiment, the metal ion is Fe(III). Reduction of Fe(III) from the ferric to ferrous valence state may be determined colorometrically using a ferrozine reagent by the methods of Stookey, *Anal. Chem.*, 42:779-782 (1970); Gibbs, *Anal. Chem.* 48:1197-1201 (1976); or Sorenson et al., *Appl. Environ. Microbiol.* 43:319-324 (1982).

Chelators are well known in the art (Howard, W. L. and D. A. Wilson. (1993) "Chelating agents" in J. I. Kroschwitz and M. Howe-Grant (Eds.) Kirk-Othmer. *Encyclopedia of Chemical Technology Vol* 5, 4th edition John Wiley and Sons, pp. 764-795, incorporated herein by reference) and high-affinity chelators can be readily assessed by testing for a positive reaction in the chrome azural S (CAS) universal assay (Schwyn and Neilands, *Anal. Biochem.*, 160:47-56 (1987)) and for reduction of metals through reductive/oxidative cycling reactions. This latter type of reaction can be tested for by using freshly prepared ferric iron, ferrozine (a ferrous iron chelator), and the redox cycling chelator to be tested. All components of the reaction are mixed in an oxygenated environment in buffered solutions. When ferric iron in the reaction mixtures is added at a range of concentrations increasing from a 1:1 molar ratio with a redox cycling chelator and the reaction is followed over time at A=562 nm, the solutions containing excess iron will display reaction curves with increasing absorbance until the reaction equilibrium has been reached. This is a result of the redox cycling action causing greater than 1:1 molar ratio of iron to be reduced, and the reduced iron reaction with the ferrozine chelator. Appropriate ferrozine/iron controls without redox cycling chelators in the reaction mixture are generally used and any control baseline absorbance subtracted from the redox cycling chelator containing samples until all iron in the redox cycling chelator reaction mixtures is reacted with the ferrozine. Similar reactions known to those skilled in the art may be used to test the redox cycling capability of chelators with other metal species. Structural features which provide for reversible oxidation-reduction reactions are well known to those of skill and provide guidance in assessing which chelators may function as redox cycling chelators.

Redox cycling chelators include flavonoids which, refers to several classes of compounds having a common structural feature in that a $C_6C_3C_6$ carbon skeleton is present. The term flavonoid is used to designate the group of substances which includes chalcones, flavones, flavonols, isoflavones, anthocyanidins, flavans, and derivatives. Chalcones are unsaturated ketones which undergo ring closure with an o-hydroxyl group to form flavanones or anthocyanidins depending on which ring contains the hydroxyl. Representative flavonoids include chrysin, morin, fisetin, robinetin, quercetin, kaempferol, pinocembrin, 3-hydroxydihydrochrysin, naringenin, taxifolin, aromadendrin, dihydromorin, and dihydrobinetin (Buchanon, M. A., "Extraneous components of wood" in B. L. Browning (Ed.) *The Chemistry of Wood*, Robert E. Krieger Publishing Co. Huntington, N.Y. (1975), incorporated herein by reference). Redox cycling chelators also include hydroquinone, ethylenedinitrilo-tetraacetic acid (EDTA), catechol, quinoline (e.g., 8-hydroxy quinoline), hydroxyquinoline, dihydroxybenzene, trihydroxybenzene, dihydroxybenzoic acid (e.g., 2,3-dihydroxybenzoic acid, 3,4-dihydroxybenzoic acid and 2,5-dihydroxybenzoic acid), or substituted derivatives thereof. The redox cycling chelator may also be obtained from a white rot or brown rot fungus, including but not limited to *Postia* spp. (e.g., *P. placenta*) or *Gloeophyllum* spp. in substantially purified form and will include hydroxyphenylacetic acid derivatives, hydroxybenzoic acid derivatives, dihydroxyphenylpentane-1,4-diol derivatives, and hydroxybenzene derivatives. Other redox cycling chelators are known to those of skill in the art.

Preferably, the redox cycling chelators have a molecular weight of less than about 2000 daltons, preferably less than 1000. The redox cycling chelators may be bound to a solid support by linking technology well known to those of skill. The redox cycling chelator is typically at a ratio of 1:1-1:100 with the metal ion species.

In another embodiment, more than one type of redox cycling chelator is used. For example, and not by way of limitation, a lignocellulosic material is contacted by both 2,5-dihydroxybenzoic acid and 8-hydroxy quinoline. In a further embodiment, the different types of redox cycling chelators have a synergistic effect thereby increasing the efficiency of the oxidation reaction.

The reduced metal species reacts by way of direct contact with an oxygen containing oxidant to yield a reactive oxygen species. The reaction is not limited to a particular mechanism and embraces both reaction by a reduced metal ion while complexed with the chelate and/or by a reduced metal ion dissociated from the complex.

Exemplary oxygen containing oxidants include hydrogen peroxide, hydroperoxides, peroxides, ozone, singlet oxygen, or permanganate. Those of skill will recognize that the organic groups of hydroperoxides and peroxides may be altered to provide the desired physico-chemical properties. Preferably, reaction with an oxygen containing oxidant occurs in an aerated environment, such as the Earth's atmosphere. The concentration of oxygen in the environment may be adjusted to control the production of free-radicals.

The reactive oxygen species generated include a variety of free-radical compounds such as superoxide anion or hydroxyl radicals. The reactive oxygen species are contacted with a lignocellulosic material to oxidize the lignocellulosic material to the desired degree. Thus, lignocellulosic material may be oxidized up to the point of mineralization (i.e., degraded to its constituent elements). An oxidized redox cycling chelator may be reduced by processes inherent in the environment to "cycle" in subsequent reactions with a metal ion.

In a preferred embodiment, a buffer is added to the necessary oxidation reagents to stabilize the pH of the oxidation environment. One skilled in the art will recognize the broad range of acceptable buffers for pH stabilization. Acceptable buffers include, but are not limited to, biological buffers such as MES, BIS TRIS, ADA, ACES, PIPES, MOPSO, BIS TRIS PROPANE, BES, MOPS, HEPES, TES, DIPSO, TAPSO, TRIZMA, HEPPSO, POPSO, EPPS, TEA, TRICINE, BICINE, TAPS, AMPSO, CHES, CAPSO, AMP, and CAPS; inorganic acid-base buffers such as boric acid, carbonic acid, chromic acid, cyanic acid, hydrazine, hydrazoic acid, hydrocyanic acid, hydroflouric acid; and organic acid base buffers such as acetate, glycine, pyruvate, lactate, triethylamine, pyrazine, allantoin, tartaric acid, piperazine, uric acid, benzoic acid, and nitrophenylacetic acid.

In a preferred embodiment, the reaction is conducted between pH 1 and pH 6. In a particularly preferred embodiment, the reaction is maintained at approximately pH 4.5 during and subsequent to oxidation of the lignocellulosic material. However, one skilled in the art will recognize that the pH may be substantially higher or lower than 4.5 without affecting the utility of the disclosed invention.

Any one of the disclosed elements of the instant method may be endogenous to the system upon which the subject method is performed or may be added to the material to which the method is being applied. Thus, for example, a metal ion, a redox cycling chelator, or oxygen containing oxidant may be a natural constituent of the material (e.g., iron present in contaminated soil) or provided, in whole or part, exogenously. The elements may be a biologically foreign compound (i.e., a xenobiotic), biological compounds synthesized or obtained from an ex vivo source (i.e., synthetic natural compounds), non-biological compounds (i.e., synthetic artificial compounds), or merely obtained from a non-fungal source. Thus, for example, the redox cycling chelator may be non-fungally derived, a compound indigenous to biological systems but synthesized ex vivo, or a non-biological synthetic compound. The embodiments used in this or other aspects of the invention may be adopted in whole or part for use in any or all aspects of the invention.

In a preferred embodiment, the method of oxidation described herein is a non-fungal method. The non-fungal oxidation method is fully functional without mediation by a fungus. However, one skilled in the art will understand that a method that is fully functional without mediation by a fungus is not necessarily devoid of a fungus. Therefore, the non-fungal method is not necessarily free of a fungus. In addition, the method is fully functional in the presence of an endogenous fungus or components of an endogenous fungus.

In another preferred embodiment, the method of oxidation described herein is a non-enzymatic method. The non-enzymatic oxidation method is fully functional without mediation by an enzyme. However, one skilled in the art will understand that a method that is fully functional without mediation by an enzyme is not necessarily devoid of an enzyme. Therefore, the non-enzymatic method is not necessarily free of an enzyme. In addition, the method is fully functional in the presence of an endogenous enzyme.

The method comprises impregnating the lignocellulosic material with the necessary oxidation reagents, which include a metal species, a redox cycling chelator, and an oxygen containing oxidant. Impregnation may be accomplished by a variety of methods including, but not limited to, coating, spraying, admixing, injecting, or saturating. Impregnating may be accomplished under various combinations of pressure, vacuum, and temperature. Thus, the surface and/or interstitial spaces of the lignocellulosic material may be impregnated with the necessary oxidation reagents.

In a preferred embodiment, impregnation of lignocellulosic material with the necessary oxidation materials is accomplished through a wet-process. In the wet-process, the oxidation reagents are added to the lignocellulosic material in an aqueous environment. One skilled in the art will recognize that various sequences of reagent addition may be used in adding the oxidation reagents to the lignocellulosic material. In a preferred embodiment, the lignocellulosic material is blended with buffered water and a metal species, followed by addition of redox cycling chelator and oxygen containing oxidant.

In a preferred embodiment, impregnation of lignocellulosic material with the oxidation materials may be accomplished through a dry-process. In the dry process, the necessary oxidation reagents are atomized onto the lignocellulosic material. One skilled in the art will recognize that various sequences of reagent addition may be used in atomizing the oxidation reagents onto the lignocellulosic material. In a preferred embodiment, redox cycling chelator, a metal species, and buffer is atomized onto the lignocellulosic material, followed by addition of an oxygen containing oxidant. The lignocellulosic material is impregnated with sufficient quantity and the appropriate proportions of the necessary oxidation reagents such that a quantitative or qualitative assessment of the lignocellulosic material indicates an increase in the extent of oxidized lignocellulosic material relative to an untreated control.

One of skill in the art would recognize that the methods disclosed herein may utilize an intermediate chelator capable of solubilizing the metal ion species prior to contacting the redox cycling chelator. For example, iron oxy(hydr)oxide solubilizing chelators, e.g., oxalic acid, phosphonic acid, phosphoric acid, may be used to solubilize the metal ion complex before transferring the metal ion species to the free redox cycling chelator.

Forming a Lignocellulosic Material Composite Article

In another aspect, the invention is directed to a method of forming a lignocellulosic material composite article. The method comprises generating a reactive oxygen species by a method disclosed herein, contacting the lignocellulosic material with the resulting reactive oxygen species, followed by the application of heat and pressure to the lignocellulosic composite material. The method of forming a lignocellulosic material composite article is consistent with the disclosed teachings of the current invention.

Those skilled in the art will readily understand that the lignocellulosic material used to form a lignocellulosic material composite article may be derived from different lignocellulosic material sources. For example, and not by way of limitation, the lignocellulosic material used to form a single lignocellulosic material composite article may be derived from various species of plants and trees.

In a preferred embodiment, the method employs two or more types of lignocellulosic materials to form a single lignocellulosic material composite article.

Upon application of heat and pressure, the oxidized lignocellulosic materials bond to form a lignocellulosic material composite article. For example, pulped wood fibers from various sources may be impregnated with buffer, an iron species, a redox cycling chelator and an oxygen containing oxidant to form a fiber mat comprising discrete wood fibers. The fiber mat may then be pressed under heat to form a fiberboard composite article. One skilled in the art will recognize that the moisture content of the discrete lignocellulosic materials, the amount of pressure, the temperature, the number of pressure or thermal cycles and other elements of the heat press process may be changed without affecting the utility of the disclosed invention. Alternative methods of pressing under increased temperatures are incorporate herein by reference.

In a preferred embodiment, the method includes an additional step of adding at least one non-lignocellulosic material prior to the application of heat and pressure. Non-lignocellulosic materials suitable for use in the present method include, but are not limited to, fiber reinforced polymers, plastics (vinyls—PVC, melamines, polyethylenes, polypropylene), glass (fiberglass), metal, organic and inorganic waste products, ceramics, cement, stone products, arbon, aramids, kevlar, and composites of all or some of these materials together. Typically, fiber reinforced polymers have been impregnated with various resins including phenol based resins, epoxies, etc.

In a further preferred embodiment, the oxidized lignocellulosic materials bond to the non-lignocellulosic materials upon application of heat and pressure.

As described above, one of skill in the art would recognize that the methods disclosed herein may utilize an intermediate chelator capable of solubilizing the metal ion species prior to contacting the redox cycling chelator.

Lignocellulosic Material Composite Article Product

In another aspect, the invention is directed to a lignocellulosic material composite article product produced by generating a reactive oxygen species by a method consistent with the disclosed teachings of the current invention, contacting the lignocellulosic material with the resulting reactive oxygen species, followed by the application of heat and pressure to form the lignocellulosic composite material.

One skilled in the art will recognize that a wide variety of lignocellulosic material composite articles may be formed by the methods disclosed in this invention. These lignocellulosic material composite articles include, but are not limited to particleboard, fiberboard, oriented strand board, laminated wood products, and plywood.

In a preferred embodiment, the lignocellulosic material composite articles comprise non-lignocellulosic materials in addition to lignocellulosic materials. These materials include, but are not limited to, fiber reinforced polymers, plastics (vinyls—PVC, melamines, polyethylenes, polypropylene), glass (fiberglass), metal, organic and inorganic waste products, ceramics, cement, stone products, arbon, aramids, kevlar, and composites of all or some of these materials together. As mentioned above, fiber reinforced polymers are well known in the art and include, for example, fiberglass, carbon fibers and aramid fibers.

As described above, one of skill in the art would recognize that the methods disclosed herein may utilize an intermediate chelator capable of solubilizing the metal ion species prior to contacting the redox cycling chelator.

Lignocellulosic Material Oxidizing System

In another aspect, the invention is directed to a system for oxidizing a lignocellulosic composite material. The system comprises a lignocellulosic material, a redox cycling chelator, a metal species and an oxygen containing oxidant.

One skilled in the art will recognize that the system may be used in a variety of processes. Such processes include, but are not limited to, forming a lignocellulosic material composite article, testing various methods of protecting lignocellulosic material, degrading lignocellulosic contaminants and determining the specific components of a particular biological or a biological lignocellulosic material. As described above, one of skill in the art would recognize that the methods disclosed herein may utilize an intermediate chelator capable of solubilizing the metal ion species prior to contacting the redox cycling chelator.

Preparation of Adhesives

In another aspect of the invention, adhesive formulations may be prepared by oxidizing organic compounds containing phenoxy, benzene derivative or other organic subunits. The adhesive formulations may be used to bond together lignocellulosic and non lignocellulosic materials such as, but not limited to, fiber reinforced polymers, plastics (vinyls—PVC, melamines, polyethylene, polypropylene), glass (fiberglass), metal, organic and inorganic waste products, ceramics, cement, stone products, carbon, aramids, kevlar, and composites of all or some of these materials together and derivatives of such materials thereof. In preparing adhesive formulations, the organic compound is oxidized by a method disclosed herein.

The production of oxygen based radicals activates the organic compound thereby producing a product with the properties of an adhesive. The resulting adhesive is applied to the materials to be bonded together. Application to the materials to be bonded may be accomplished by various methods known in the art such as, but not limited to, spraying, atomizing, blending and spot applying. After application, the materials to be bonded are contacted together by methods known by those skilled in the art such as, but not limited to, clamping, pressing together, extruding and pultruding. Bonding, setting, forming, and fixation occur at ambient or elevated temperatures, or under the influence of an accelerating treatment such as microwave, radiofrequency or other energy treatment until a permanent bond or the desired strength and/or form of product is obtained.

In one embodiment, the organic compound comprises a benzene derivative, which is oxidized.

In another embodiment, the organic compound is derived from a plant.

In a preferred embodiment, the organic compound comprises phenoxy subunits, which are oxidized.

In a further preferred embodiment, the organic compound is a lignocellulosic material.

In another embodiment, the organic compound is oxidized according to the teachings described herein and then added to the materials to be bonded.

In another embodiment, the organic compound is added to the materials to be bonded and then oxidized according to the teachings described herein.

In a preferred embodiment, the adhesive formulation is dissolved in an organic solvent. In a further preferred embodiment, the organic solvent is an alcohol.

In a preferred embodiment, the materials to be bonded are treated to expose the surface area. Treatments are well known in the art and include, for example, sawing, planing, chipping, flaking, sanding, chemical etching, biological etching, sonic etching and photo etching.

As described above, one of skill in the art would recognize that the methods disclosed herein may utilize an intermediate chelator capable of solubilizing the metal ion species prior to contacting the redox cycling chelator.

Waste Degradation

In another aspect of the invention, waste products are oxidized and thereby degraded. Degradation is accomplished by generating a reactive oxygen species by a method consistent with the disclosed teachings of the current invention and contacting the waste products with the resulting reactive oxygen species. The method of degrading waste is consistent with the current invention.

Various methods have employed Fenton chemistry to oxidatively degrade waste. These methods are incorporated into the present invention by reference. One skilled in the art will recognize that the present invention may be used to degrade a wide array of organic waste compounds, including, but not limited to compounds comprising nitroaromatic and nitrophenolic groups (such as dinitrotoluene (DNT), nitrophenols, dinitrophenols, dinitrocresols, trinitrophenols, trinitrocresols, nitrobenzene, 2,4- and 2,6-dinitrotoluene, and mononitrobenzene) and "BTEX" waste products, which is understood by those familiar with the art to refer to benzene, toluene, ethyl benzene and the xylenes (m-, p-, and o-).

In one aspect, the present invention is directed to the degradation of an organic waste compound.

In a preferred embodiment, the present invention is directed to the degradation of an organic waste compound that is not a halogenated phenolic compound.

In a further preferred embodiment, the present invention is directed to the degradation of an organic waste compounds that is not a chlorinated phenolic compound.

In a still further preferred embodiment, the present invention is directed to the degradation of an organic waste compound that is not pentachlorophenol or trichlorophenol.

In a preferred embodiment, the present invention is directed to the degradation of an organic waste compound that is not a polysaccharide.

In a further preferred embodiment, the present invention is directed to the degradation of an organic waste compound that is not a polysaccharide containing glucose.

In a still further preferred embodiment, the present invention is directed to the degradation of an organic waste compound that is not cellulose.

In another aspect, the present invention is directed to the degradation of an organic waste compound derived from the synthesis of chemical monomers and/or polymers. Such organic waste products include, but are not limited to, those derived from the synthesis of chemical polymers, including, but not limited to, dextran, epoxy resins, lucite, polyethylene glycol, nylon, polyacrylamide, polyaniline, polybutadienes, polystyrene, polyetherimide, poly(dimethylsiloxane), polyethylene, polyehtylenimine, polymethacronitrile, poly(methyl methacrylate), poly(caprolactam), poly acetal resin, polypropylene, polysulfone, poly(vinyl alcohol), poly(N-vinylpyrrolidone), poly(4-vinylphenol) and variations thereof known in the art. One skilled in the art will recognize the various substituted or unsubstituted aromatic and aliphatic organic waste compounds derived from the synthesis of such chemical polymers. Organic waste products from the synthesis of chemical polymers include, but are not limited to, organic inhibitors, polymerization side products, and monomer and oligomer subunits of chemical polymers.

In a preferred embodiment, the organic waste product is derived from a plant, e.g., a lignocellulosic material.

In a preferred embodiment, the present invention is directed to the degradation of a dye, including, but not limited to, azo dyes, anthraquinone dyes, benzodifuranone dye, polycyclic aromatic carbonyl dyes, indigoid dyes, polymethine and related dyes, styryl dyes, di- and triaryl carbonium and related dyes, phthalocyanines, quinophthalones, nitro and nitroso dyes and the like (Jacqueline I. Kroschwitz, *Encyclopedia of Chemical Technology*, vol. 8, pp. 542-576, John Wiley & Sons, Inc., New York (1993)). Such dyes are well known in the art.

In a further preferred embodiment, the present invention is directed to the degradation of a dye that is not a halogenated phenolic compound.

In a further preferred embodiment, the present invention is directed to the degradation of a dye that is not a chlorinated phenolic compounds.

In a still further preferred embodiment, the dye is selected from the group consisting of Carta Yellow RW, Carta Yellow G, Cartasol Red 2GF, and Cartasol Turquoise K-RL or derivatives or analogs thereof.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

As described above, one of skill in the art would recognize that the methods disclosed herein may utilize an intermediate chelator capable of solubilizing the metal ion species prior to contacting the redox cycling chelator.

EXAMPLES

Example I

Example I describes a method of forming softwood fiberboard using a non-enzymatic lignocellulosic material oxidizing system through a wet-process technique.

1.1. Materials

Thermomechanically pulped *Pinus ponderosa* wood fibers with a small percentage *Abies concolor* were used in this study. The defibration process involved 0.55 MPa and 140° C. in a steam digester applied to wood chips, shavings, and sawdust followed by Bower double disk refining at pressures >0.55 MPa. The wood fibers were at a moisture content of 9-11% during fiberboard processing. A model chelator, functionally and structurally similar to the natural chelators produced by *G. trabeum*, 2,3-dihydroxybenzoic acid (DHBA) (Goodell et al., *J. Biotech.*, 53:133-162 (1997)), was used in this study for the bonding reactions with ferric (anhydrous ferric chloride) or ferrous (ferrous sulfate hexahydrate) iron (Aldrich Chemical Company). Hydrogen peroxide 30% w/w (Alfa Aesar Chemical Company) was used as the reactive oxidant for the Fenton reactions. Acetate buffer solutions were prepared with NaAc and HAc to maintain pH of the furnish around 4.5. Urea-formaldehyde resin was used in control samples. To blend the fibers and chemicals together, a liquids-solids blender was used. For the dry-process fiberboard, an airless sprayer was used to atomize the chemicals. A vacuum system was used to form the mat within a plexiglass forming box with a perforated aluminum sheet base. A 152 mm×152 mm laboratory hot-press modified with four Chromalox heating cylinders and two Robotemp heat controllers was used for pressing the fiber panels. To measure the temperature of the platens while hot-pressing, two K-type thermocouples were placed inside the top and bottom platens. Thermocouples were used to read the change in temperature in selected boards during the press cycle. Measurement of the vertical density profile of the fiberboard, was achieved using a QMS X-ray based Density Profiler. The samples were tested for internal bond strength and static bending according to ASTM D-1037 using a model 4202 Instron test machine with a 10 kN load cell.

1.2. Methods

Softwood fiber (500 g) was blended with acetate-buffered water and the iron species, followed by the 2,3-DHBA and hydrogen peroxide when necessary. The chemicals and fiber were blended for one minute after each chemical addition. Table 1 shows the chemical concentrations of the treatments used in the experiment, which were calculated for a total solution volume of 8 liters. Three fiberboard repetitions were produced for each reaction time. The pH of the pulp was maintained around pH 4.5 by measuring spot samples. Reaction times of 5, 30, 60, and 180 minutes were used. Because the characteristic reaction time for the Fenton/chelator system was not known, kinetic studies were performed to possibly reveal some information on the reaction mechanism with wood components. After each reaction time a 2 liter aliquot of the total 8 liter suspension with approximately 125 grams of oven dry wood weight was removed from the blender. Each aliquot was added to 5 liters of distilled water and thoroughly mixed while screening through the forming box to remove most of the water from the fiber mat. The mat was prepressed at a pressure of approximately 34.5 kPa. The mat moisture content before pressing ranged from 300-400%. A press cycle of 200° C. arid 2.76 MPa for four minutes, similar to the "toasting cycle" (Suchsland, et al., Fiberboard manufacturing practices in the United States, USDA Forest Service, Agriculture Handbook No. 640 (1990)), was used to produce a 4 mm S2S board. Table 2 shows the targeted fiberboard parameters. After pressing, the fiberboard was removed from the press and placed in a 20° C. incubator for cooling and to help facilitate the removal of the caul plates from the fiberboard. Finally, two 51 mm×51 mm samples for internal bond strength tests were cut from the boards and conditioned at 55% relative humidity (RH) and 25° C. for one week prior to testing. Tensile testing perpendicular to the surface (ASTM D-1037) was performed on the samples with a head speed of 0.305 mm/min. All statistical analysis was performed using SYSTAT 9.0 software.

Table 2 shows the experimental designs for the wet process fiberboards and Table 3 shows the targeted parameters.

TABLE 2

Experimental design for wet-process fiberboards.

| Treatment | 2,3-DHBA (mM) | $FeCl_3$ (mM) | $Fe_2SO_4$ (mM) | $H_2O_2$ (mM) | NaAc pH 4.5 (M) | Reaction~Time (min) | Board Reps. |
|---|---|---|---|---|---|---|---|
| A | — | — | — | 20 | 0.05 | 5, 30, 60, 180 | 3 |
| B | — | — | 5 | 20 | 0.05 | 5, 30, 60, 180 | 3 |
| C | — | — | 10 | 20 | 0.05 | 5, 30, 60, 180 | 3 |
| D | 0.5 | 2 | — | 20 | 0.05 | 5, 30, 60, 180 | 3 |
| E | — | — | — | — | 0.05 | 5 | 3 |

TABLE 3

Wet-process Fiberboard targeted parameters.

| Fiber Mat Moisture Content (%) | Pressing Temperature (° C.) | Platen Pressure (MPa) | Final thickness (mm) | Press time (mm.) | Final Density (g/cm$^3$) |
|---|---|---|---|---|---|
| 300 | 200 | 2.75 | 4 | 5 | 1.00 |

1.3. Results

Table 4 compares the internal bond strength of all the fiberboard treatments across reaction times. Tukey's multiple mean comparison test was used to compare the means of each treatment with an overall significance level, $\alpha$, equal to 0.05. The mean comparison showed two significantly different board types. Treatments A (20 mM $H_2O_2$, 0.142 MPa) and B (5 mM Fe(II):20 mM $H_2O_2$, 0.257 MPa) showed no significant difference from each other. Treatment E (water control, 0.260 MPa) showed no significant difference when compared to treatment A and B. Both treatment A and B were significantly different than the 5 minute reaction time in treatment C (10 mM Fe(II):20 mM $H_2O_2$, 0.502 MPa). Treatment D (redox cycling chelator treatment, 0.623 MPa) was significantly different than treatments A, B, and E, but not significantly different than C.

Treatment with the DHBA redox cycling chelator (D) displayed one of the highest internal bond strengths when compared to other treatments. The 0.5:2 ratio of DHBA:FeIII produced an environment where the strongest bond was produced during hot pressing. The weakest fiberboard treatment was the 20 mM $H_2O_2$ only treatment. Peroxide alone can oxidatively react with wood components to weaken and cleave covalent bonds, especially phenolic linkages, as seen with the bleaching of wood pulp for paper manufacturing (Gierer, J., *Holzforschung*, 44: 395-400 (1990)). However, much of this oxidative reaction is likely due to the action of contaminating metals in the pulp. Significant bonding in our work with the wet-process system occurred only in the presence of the complete Fenton system.

TABLE 4

Multiple comparison of IB values for wet-process treatments and reaction times.[1]

| Treatment | Reaction time (mm.) | Average Density (g/cm$^3$) | IB (MPa) |
|---|---|---|---|
| A | 5 | 1.02 | 0.106 a[1] |
| A | 30 | 0.95 | 0.123 a |
| A | 60 | 0.96 | 0.180 a |
| A | 180 | 0.99 | 0.157 a |
| B | 5 | 1.00 | 0.217 a |
| B | 30 | 0.99 | 0.296 a,b |
| B | 60 | 1.00 | 0.348 a,b |
| B | 180 | 1.00 | 0.168 a |
| C | 5 | 1.01 | 0.502 b |
| C | 30 | 1.01 | 0.491 a,b |
| C | 60 | 1.02 | 0.434 a,b |
| C | 180 | 1.01 | 0.351 a,b |
| D | 5 | 1.01 | 0.550 b |
| D | 30 | 1.00 | 0.632 b |
| D | 60 | 1.04 | 0.689 b |
| D | 180 | 1.00 | 0.621 b |
| E | 5 | 0.95 | 0.260 a |

[1]Figures in each column marked by different letters give the significance at $\alpha = 0.5$. The same letter shared by the factor levels indicates no significant differences between the levels.

Each treatment, except the 10:20 Fe11:peroxide ratio, showed a peak of internal bond strength at the 60 minute reaction time with values as much as 0.14 MPa greater than the 5 minute reaction time. All samples decreased slightly in internal bond strength after the 60 minute reaction time. The treatments, however, showed much variation in bond strength at each reaction time.

1.4. Conclusions

Activation of softwood fiber using a redox cycling chelator in a wet-process fiberboard method was performed to investigate this treatment's potential for bonding wood fiber. The 1:4 ratio of DHBA:FeIII with peroxide provided the highest bond strength compared to controls.

Example II

Example II describes a method of forming softwood fiberboard using a non-enzymatic lignocellulosic material oxidizing system employing a dry-process technique.

2.1. Materials

All materials used in this study were identical to the materials used in Example I.

2.2. Methods

Softwood fiber (100 g) was placed in the liquids-solids blender and the chemicals were atomized onto the fibers following the experimental design shown in Table 3. After the treatment of wood fibers with 2,3-dihydroxybenzoic acid (DHBA), ferric chloride (Fe(III)), and acetate buffer hydrogen peroxide was added. The pH of the furnish was maintained around pH 4.5 by measuring spot samples, and in most cases pH adjustment was not necessary. Fibers were thoroughly mixed for one minute in the blender, and then for an additional minute after hydrogen peroxide addition. Following treatments with the necessary oxidizing reagents, the addition of DHBA to the iron would change the fibers purple to dark brown in color. After $H_2O_2$ addition the color would change to a reddish brown. The moisture content (MC) of the fiber after mixing with 100 mL of the treatment solutions ranged from 100-120% MC and upon transfer to the forming box was 70-80% MC. This latter % MC was the target MC before entering the hot press and is defined for the purpose of this research as the "dry" treatment process. As a reference comparison for the dry treatment process, fiberboard was also produced using urea-formaldehyde resin applied at 10-12% of the oven dry weight of wood.

After treatment, the fibers were vacuum-blown, and felted into the former/pre-press. A mat thickness of approximately 150 mm was used to produce a final board thickness of 5 mm with a target density of 0.90 g/cm$^3$. The mat was pre-pressed to a constant thickness of 65 mm and then hot pressed between aluminum caul plates with a steel screen to 5 mm stops. Press temperature was 170-180° C. for a total time of ~380 seconds to give a 5 mm S1S board.

Following pressing, the boards were cooled in a 20° C. incubator and samples were prepared for internal bond and static bending tests by conditioning at conditioning at 18° C. and 67% RH for two weeks. Three boards were produced for each treatment. For each fiberboard, two 51 mm×51 mm internal bond samples and one 51 mm×152 mm static bending sample were prepared. Modulus of rupture and modulus of elasticity were determined from the static bending sample. All statistical analysis was performed using SYSTAT 9.0 software.

Table 5 shows the experimental designs for the dry process fiberboards and Table 6 shows the targeted parameters.

TABLE 5

Experimental design for dry-process fiberboards.

| Chelated system | 2,3-DHBA (mM) | FeCl$_3$ (mM) | $H_2O_2$[4] % w/w | NaAc pH 4.5 (M) | Board Reps |
|---|---|---|---|---|---|
| A | 1 | 2 | 9.3 | 0.05 | 3 |
| B | 1 | 10 | 9.3 | 0.05 | 3 |
| C | 5 | 10 | 9.3 | 0.05 | 3 |
| D | 1 | 0 | 9.3 | 0.05 | 3 |
| E | 5 | 0 | 9.3 | 0.05 | 3 |
| F | 0 | 2 | 9.3 | 0.05 | 3 |
| G | 0 | 10 | 9.3 | 0.05 | 3 |
| H | 0 | 0 | 9.3 | 0.05 | 3 |
| I | 0 | 0 | 0 | 0.05 | 3 |
| J | 0 | 2 | 0 | 0.05 | 3 |
| K | 0 | 10 | 0 | 0.05 | 3 |
| L | 100 | 200 | 9.3 | 0.05 | 3 |
| M[1] | 100 | 200 | 9.3 | 0.05 | 3 |
| N | 200 | 2000 | 9.3 | 0.05 | 1 |
| UF Resin (~10% w/w) | 0 | 0 | 0 | no buffer | 3 |

[1]Instead of using 2,3-dihydroxybenzoic acid, catechol was used as the model chelator.

TABLE 6

Dry process fiberboard targeted parameters.

| Fiber Mat Moisture Content (%) | Pressing Temperature (° C.) | Cooking Pressure (MPa) | Final thickness (mm) | Press time (sec.) | Final Density (g/cm³) |
|---|---|---|---|---|---|
| 70-80 | 170-180 | 170 | 5 | 380 | 0.900 |

2.3. Results

Table 7 shows a comparison of mechanical properties for the dry-process fiberboard. Tukey's multiple mean comparison test was again used to compare the means of each treatment with an overall significance level, a, equal to 0.05. The average density values follow the strength values of internal bond, modulus of rupture, and modulus of elasticity. The first three redox cycling chelator treatments, and the iron plus hydrogen peroxide reference sample, are denser compared to controls and most reference boards, except the board with a 1:10 ratio of DHBA to Fe(III). The fact that the redox cycling chelator fiberboards exceeded the target density shows that densification continued throughout pressing and there was little springback after curing. More springback was apparent with the controls. The 1:10 chelator treated fiberboard displayed a density of 1.5 g/cm³. As this is the equivalent density of solid wood substance this fiberboard was pressed to the maximum density of wood, eliminating voids.

For internal bond strength, the redox cycling chelator boards (samples B, G, and N) and the UF fiberboard (Table 6) showed the most significant difference between treatments. Treatments B (0.328 MPa) and N (0.576 MPa), the 1:10 ratio redox cycling chelator boards, displayed a significant increase in average internal bond compared to all other controls. Urea-formaldehyde boards also displayed a significantly greater IB when compared to all other treatments, except B and G (0.256 MPa). Of the three redox cycling chelator treatments, the 1:10 ratio (B) of DHBA:FeIII shows the highest internal bond value and is statistically different than most treatments. Another high bond strength treatment was the 0:10 ratio reference sample (G), showing statistical similarities to the 1:10 treatment (B), the 5:10 treatment (C, 0.242 MPa), the high concentration DHBA:FeIII treatment (L, 0.235 MPa), and the UF fiberboard (0.447 MPa). All controls without iron or without hydrogen peroxide had low bond strength. The fact that treatments with DHBA but without iron exhibit low bond strength highlights the importance of the redox cycling chelator for promotion of bonding. To further confirm the importance of the chelator:iron ratio dependence to enhance fiber bonding, a high concentration reference treatment (N) of 0.2M DHBA: 2M Fe(III): 9.3% $H_2O_2$ was applied. This reference board, with a 1:10 ratio of DHBA:Fe(III), displayed very high bond strength exceeding all treatments including the UF reference board. The 1:10 DHBA:iron ratio used in these treatments supports previous results suggesting an optimal treatment ratio for free radical production (Xu et al., *J. Biotechnology*, 67:43-57 (2001)) and wood fiber bonding.

TABLE 7

Multiple comparison of average mechanical property values for dry-process treatments.[1,2]

| Treatment | Average Density (g/cm³) | IB (MPa) | MOR (MPa) | MOE (GPa) |
|---|---|---|---|---|
| A | 0.97 | 0.190 b | 19.1 b | 2.39 b |
| B | 1.02 | 0.328 c | 19.9 b | 2.73 b |
| C | 1.01 | 0.242 b,c | 20.6 b | 2.69 b |
| D | 0.88 | 0.149 a,b | 8.21 a | 0.986 a |
| E | 0.88 | 0.131 a,b | 7.76 a | 1.08 a |
| F | 0.94 | 0.145 a,b | 16.4 a,b | 2.16 b |
| G | 1.00 | 0.256 c | 20.1 b | 2.68 b |
| H | 0.87 | 0.139 a,b | 8.00 a | 1.06 a |
| I | 0.86 | 0.0938 a,b | 14.6 a,b | 2.04 b |
| J | 0.88 | 0.0522 a | 5.74 a | 0.614 a |
| K | 0.78 | 0.0381 a | 5.83 a | 0.648 a |
| L | 0.84 | 0.235 b,c | 6.91 a | 1.16 a |
| M | 0.87 | 0.212 b | 8.13 a | 0.986 a |
| N | 1.52 | 0.576 d | 5.53 a | 1.06 a |
| UF | 0.87 | 0.447 c | 43.4 c | 2.83 b |

[1]Figures in each column marked by different letters give the significance at $\alpha = 0.05$. The same letter shared by the factor levels indicates no significant differences between the levels.

Comparison of modulus of rupture and modulus of elasticity of the boards shows that the redox cycling chelator fiberboard (A, B, and C) are significantly different than the controls and most reference samples, however treatment ratios 0:2 (F), 0:10 (G), and acetate-buffered water (1) were not significantly different from the redox cycling chelator fiberboard. The urea-formaldehyde fiberboard (43.4 MPa) was stronger than the redox cycling chelator fiberboard (~20 MPa) in MOR, and only 4% stronger in MOE. The UF fiberboard (2.63 GPa) was comparable to the DHBA:FeIII (~2.6 GPa) and the 10 mM Fe(III) treatments F (2.16 GPa) and G (2.68 GPa) in MOE. As with the internal bond test, the redox cycling chelator treatments (A, B, C) displayed high MOR & MOE values. The iron control board (G) with only Fe(III) and hydrogen peroxide had a significantly higher MOR, MOE, and IB values than all other controls.

Interestingly, the 1:10 ratio of DHBA:FeIII (N) at high concentrations displayed very low MOR (5.53 MPa) and MOE (1.06 GPa) even though bonding between the fibers was high as shown by IB tests.

The urea-formaldehyde fiberboard had the highest MOR value in the sample set. Since urea-formaldehyde does not degrade the wood, the fiber is able to retain its longitudinal strength.

2.4. Conclusions

In the activation of softwood fiber using a modified dry-process the redox cycling chelator treatments produced a consistently higher bond and had high bending strength compared to controls not treated with the complete redox cycling chelator treatments. The strongest boards were produced using a 1:10 ratio of DHBA:FeIII with peroxide. When the 1:10 ratio was increased from the mM range to the molar concentration range of DHBA:FeIII, the highest internal bond strength and density resulted over all treatments. Increasing the concentration of the redox cycling chelator treatment by this magnitude, however, decreased bending strength significantly.

The Fe(III)-only reference board displayed a similar bond and bending strength to the 1:10 DHBA:FeIII ratio boards, suggesting that perhaps natural chelators in the wood are reacting in a way similar to low concentrations of 2,3-DHBA in a Fenton-chelator mechanism. Urea-formaldehyde resin fiberboards with 10-12% solid content displayed the highest MOR strength properties over all the Fenton-chelator treatments, but showed similar MOE and IB properties to the Fenton-chelator boards. The amount of DHBA added to the wood fiber was not optimized; however, the data support use of a very short treatment time with DHBA in the 10-100 mM range to improve bonding and limit strength reduction.

Example III

Example III describes a method of degrading chemical dyes using a non-enzymatic dye oxidizing system.

3.1. Materials

Four liquid dyes from Clariant (Charlotte, N.C.) were used in this preliminary study. The trade names of the dyes used were Carta Yellow RW liquid (Stilbene type), Carta Yellow G liquid (Stilbene type), Cartasol Red 2GF liquid (Azo type), and Cartasol Turquoise K-RL liquid. Ferrous Sulfate Heptahydrate was used as iron source, which was purchased from Sigma (St Louis, Mo.). Hydrogen peroxide (30% w/w) and 2,3-dihydroxybenzoic acid (DHBA) were purchased from Aldrich (Milwaukee, Wis.). All the stock solutions were prepared from deionized water and the chemicals used without further purification.

3.2. Methods

Experiments were carried out at room temperature (23° C.) in the dark. The reaction mixtures contained 0.125 g/l liquid dye (8000× dilution), 100 µM Fe(II), 100 µM DHBA, and 10 mM $H_2O_2$ in a final volume of 2 ml, unless otherwise noted. The pH value of the diluted dyes was taken before adding any other chemicals and then again after treatment. The pH of the reaction mixtures was all appropriate without adjustment for further reaction. $H_2O_2$ was added last to the mixture to initiate the reaction. The control (unmediated Fenton reaction) contained the same chemicals (except for DHBA) and was conducted under the same conditions as the mediated Fenton reaction mentioned above. Dye degradation was measured as the change in absorbance between 250 nm and 800 nm by a Beckman 7400 spectrophotometer.

3.3. Results

Figure 2:
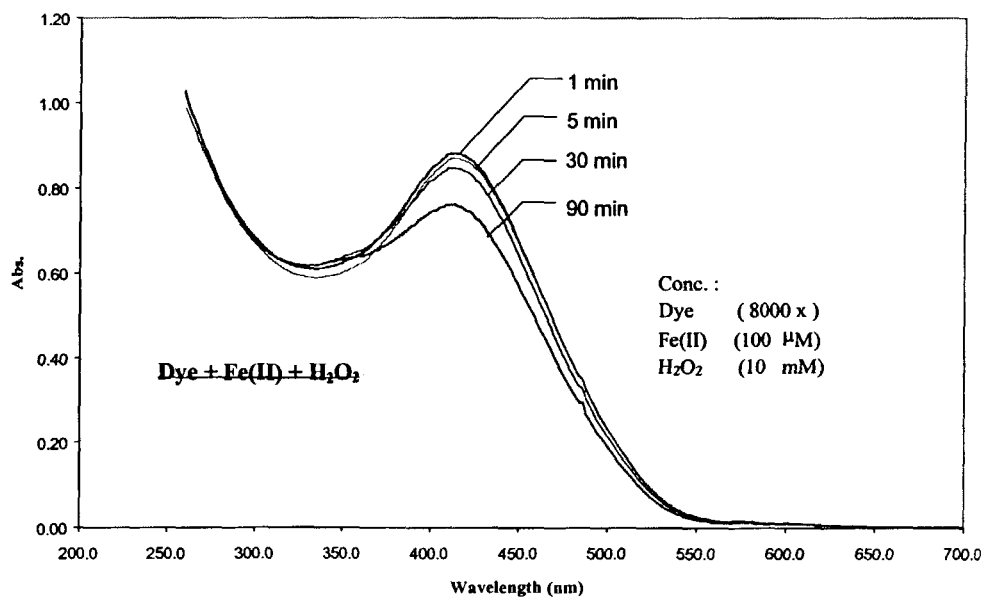
FIG. 2. An UV spectra showing the degradation of Carta yellow G dye by Fe(II)+$H_2O_2$ alone over time.
Figure 3:
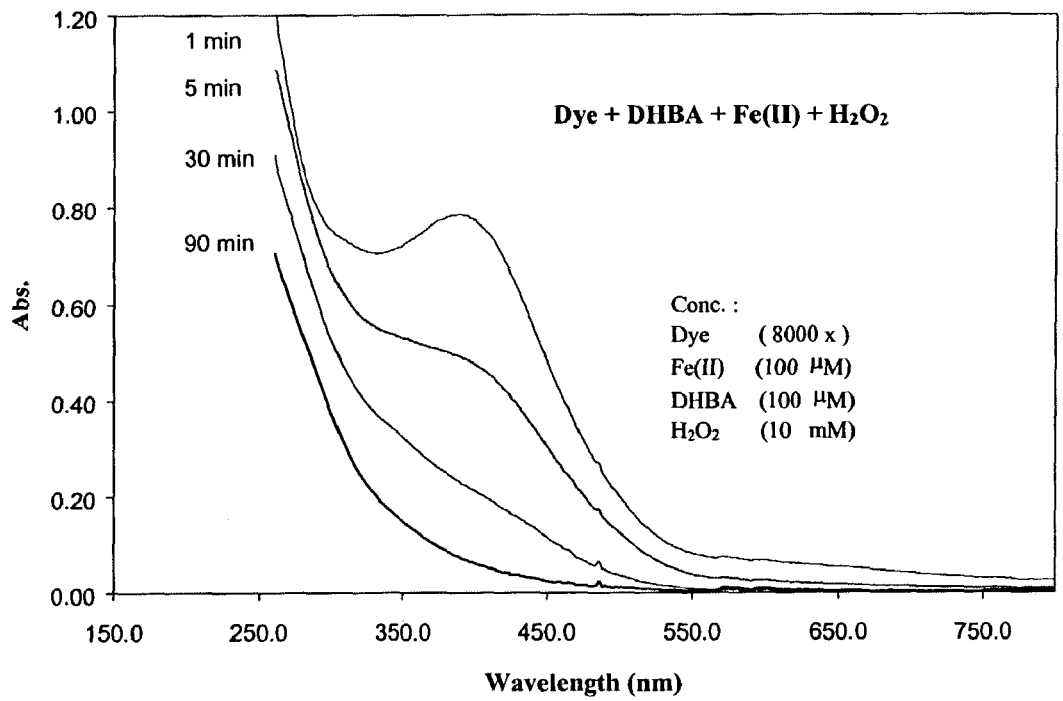
FIG. 3. An UV spectra showing the degradation of Carta yellow G dye by DHBA mediated Fenton reaction over time.
Figure 4:
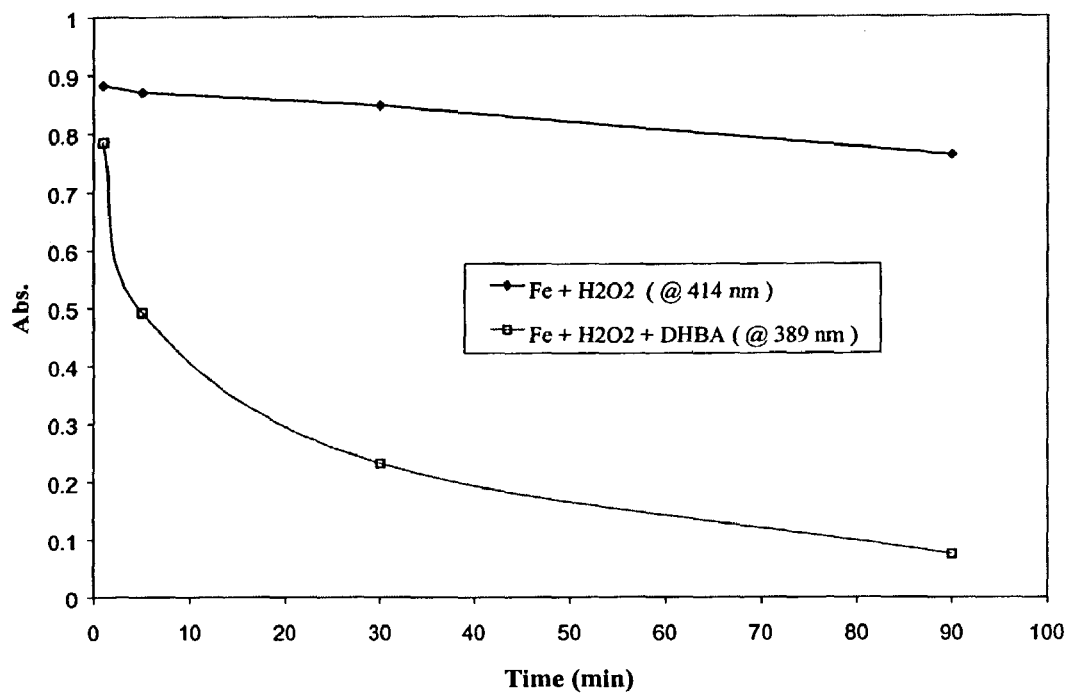
FIG. 4. A comparison of Carta yellow G dye degradation by Fenton reagent vs. chelator (DHBA)/Fenton system.
Figure 5:
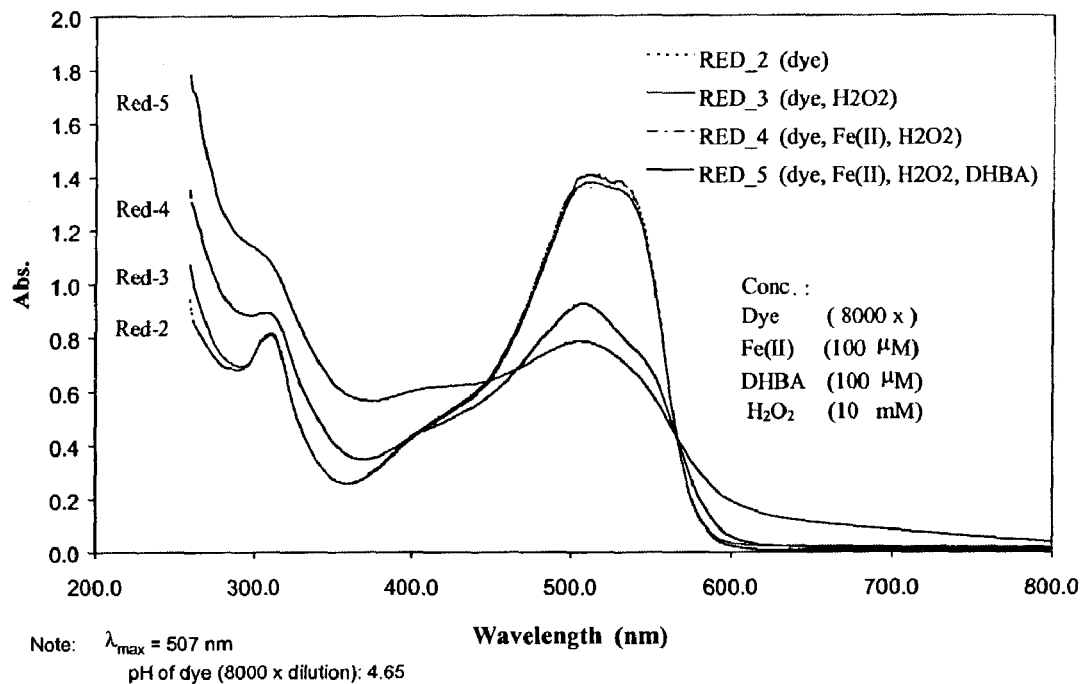
FIG. 5. An UV spectra showing the degradation of CARTASOL red 2GF dye after 1 minute incubation.
Figure 6:
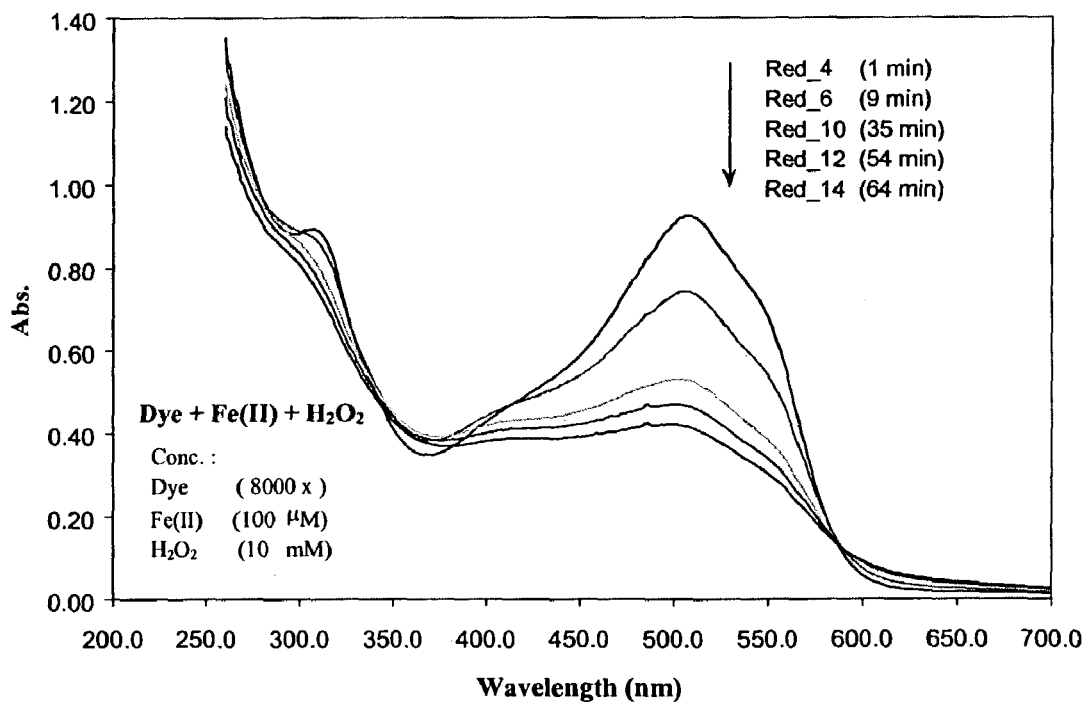
FIG. 6. An UV spectra showing the degradation of CARTASOL red dye by Fe(II)+$H_2O_2$ alone over time.
Figure 7:
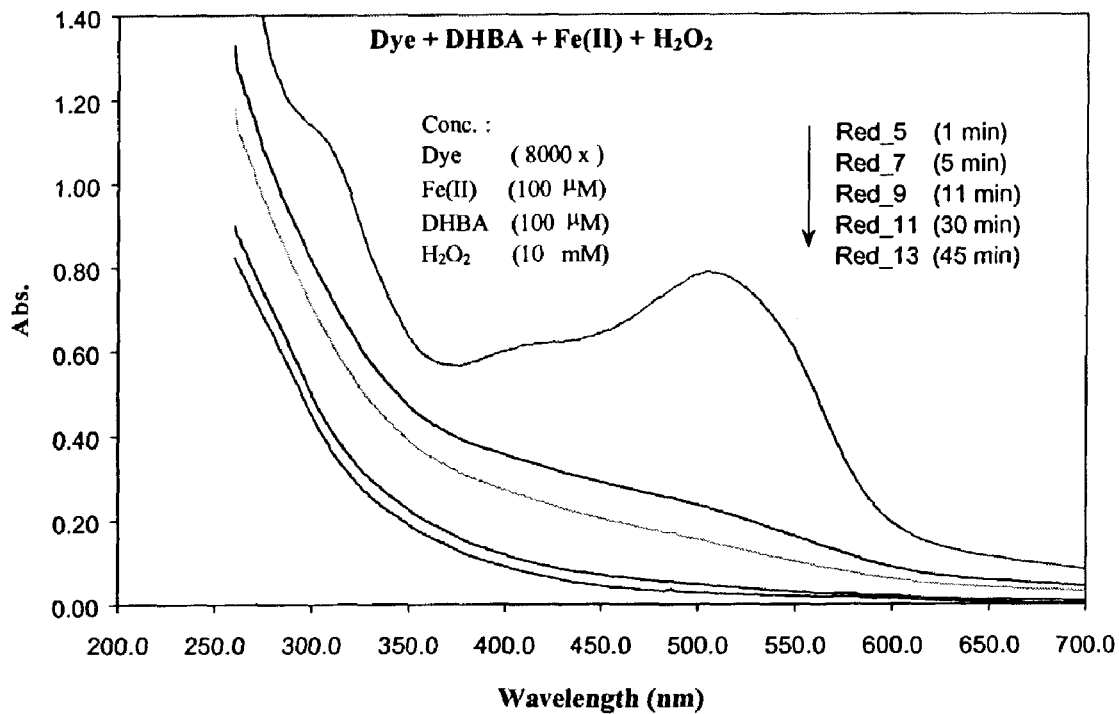
FIG. 7. An UV spectra showing the degradation of CARTASOL red dye by mediated Fenton system.
Figure 8:
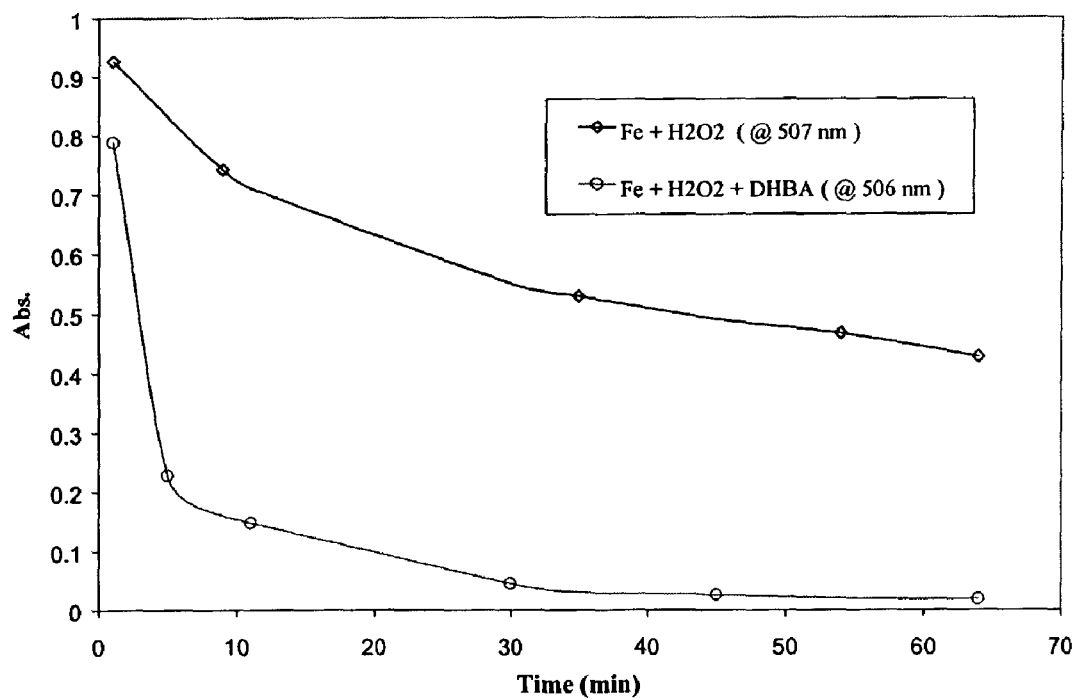
FIG. 8. A comparison of CARTASOL red dye degradation by Fenton reagent vs. chelator (DHBA)/Fenton system.
Figure 9:
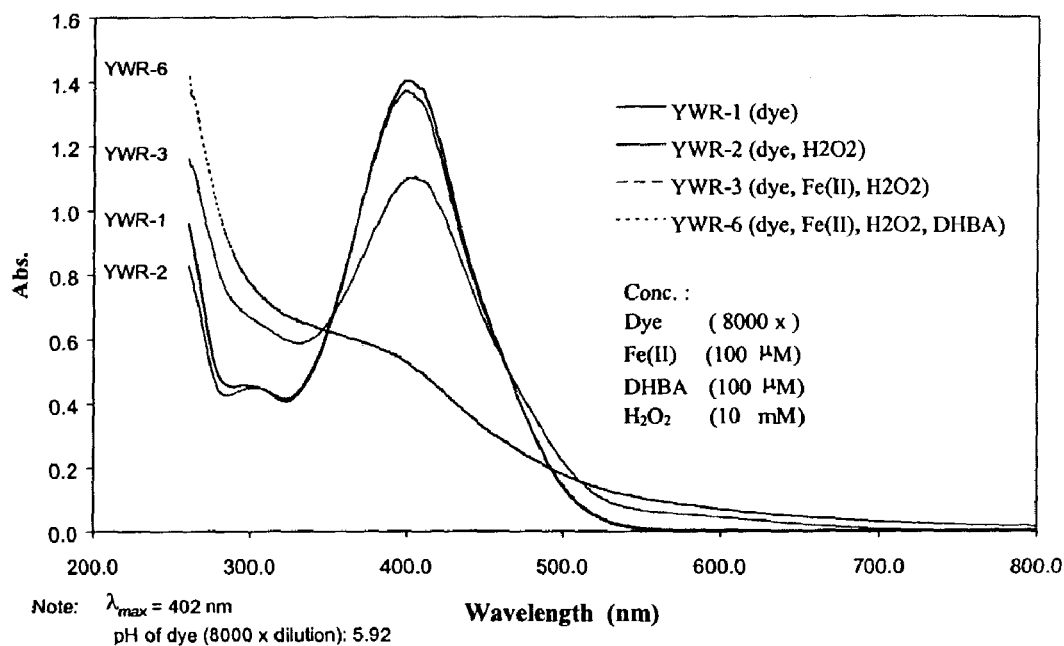
FIG. 9. An UV spectra showing the degradation of CARTA yellow RW dye after 1 minute incubation.
Figure 10:
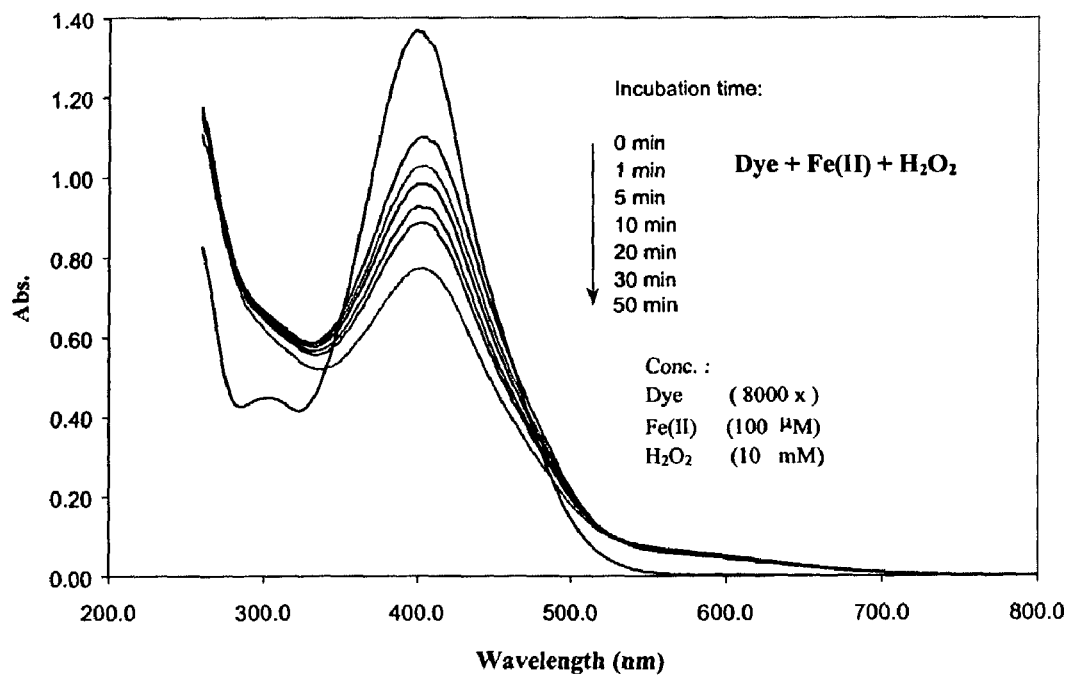
FIG. 10. An UV spectra showing the degradation of CARTA yellow RW dye by Fe(II)+$H_2O_2$ alone over time.
Figure 11:
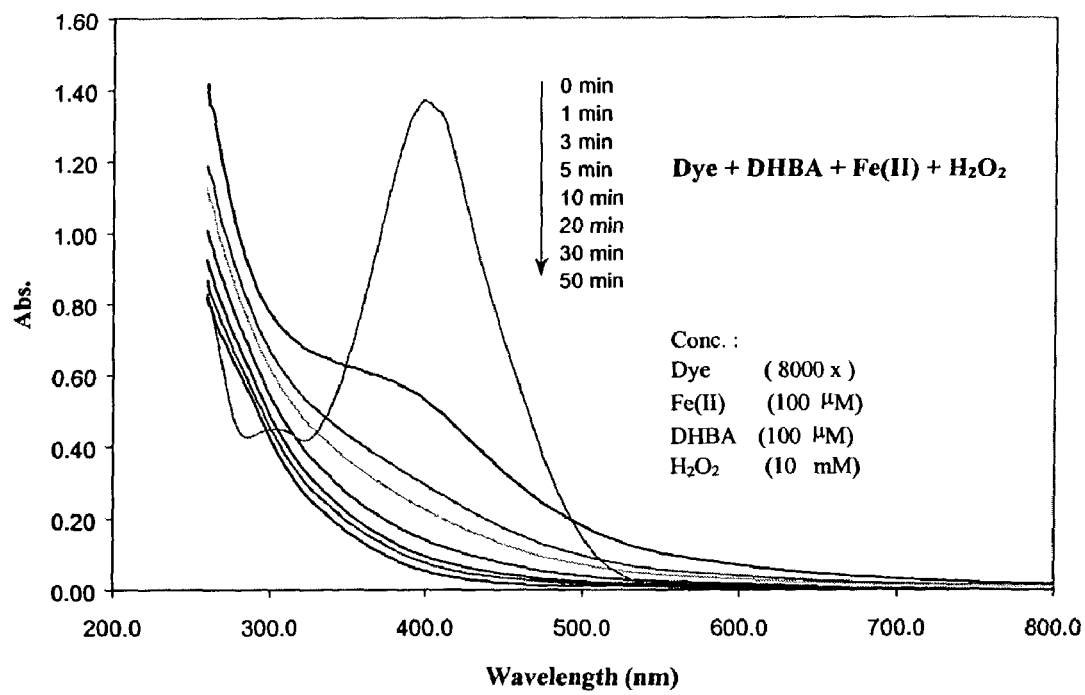
FIG. 11. An UV spectra showing the degradation of CARTA yellow RW dye by mediated Fenton reaction.
Figure 12:
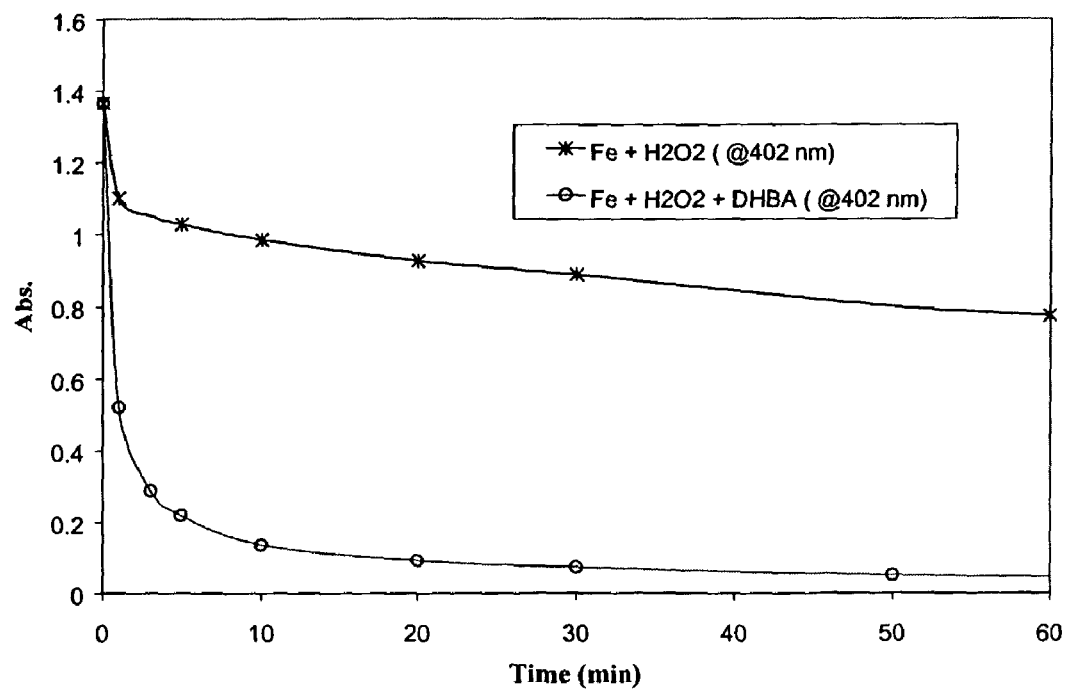
FIG. 12. A comparison of CARTA yellow RW dye degradation by Fenton reagent vs. chelator (DHBA)/Fenton system.
Figure 13:
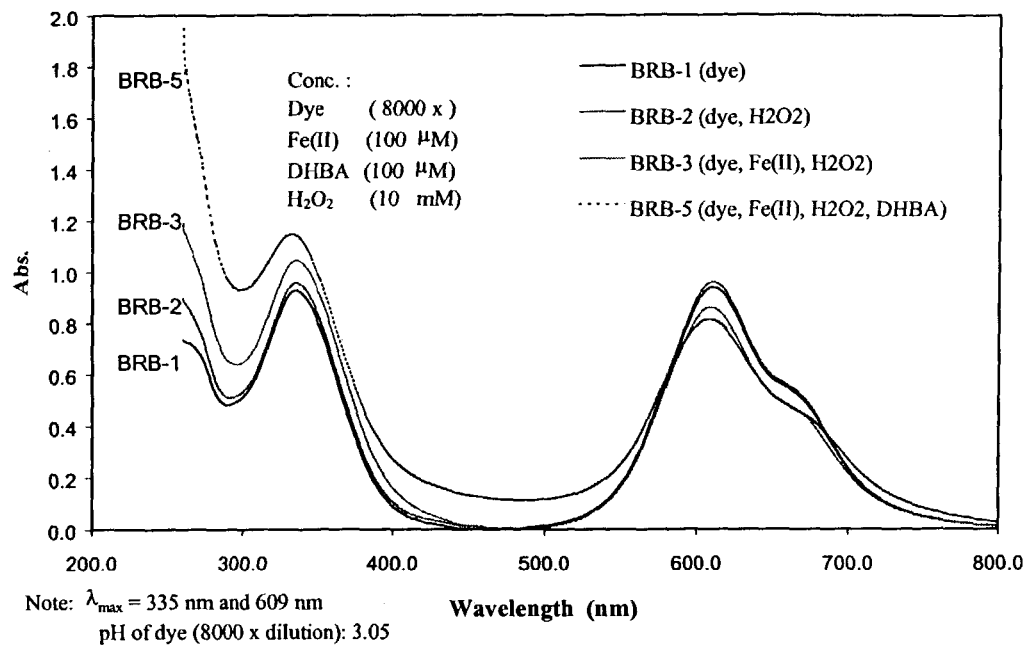
FIG. 13. An UV spectra showing the degradation of CARTASOL BRILLIANT TURQUOISE K-RL dye after 1 minute incubation.
Figure 14:
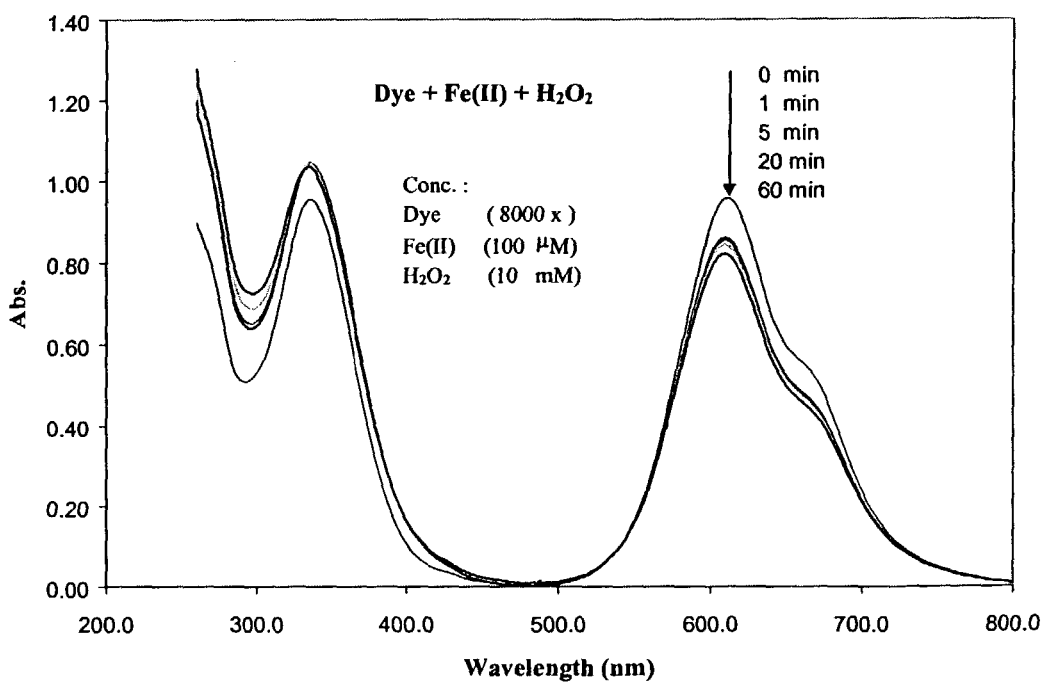
FIG. 14. An UV spectra showing the degradation of CARTASOL BRILLIANT TURQUOISE K-RL dye by Fe(II)+$H_2O_2$ alone over time.
Figure 15:
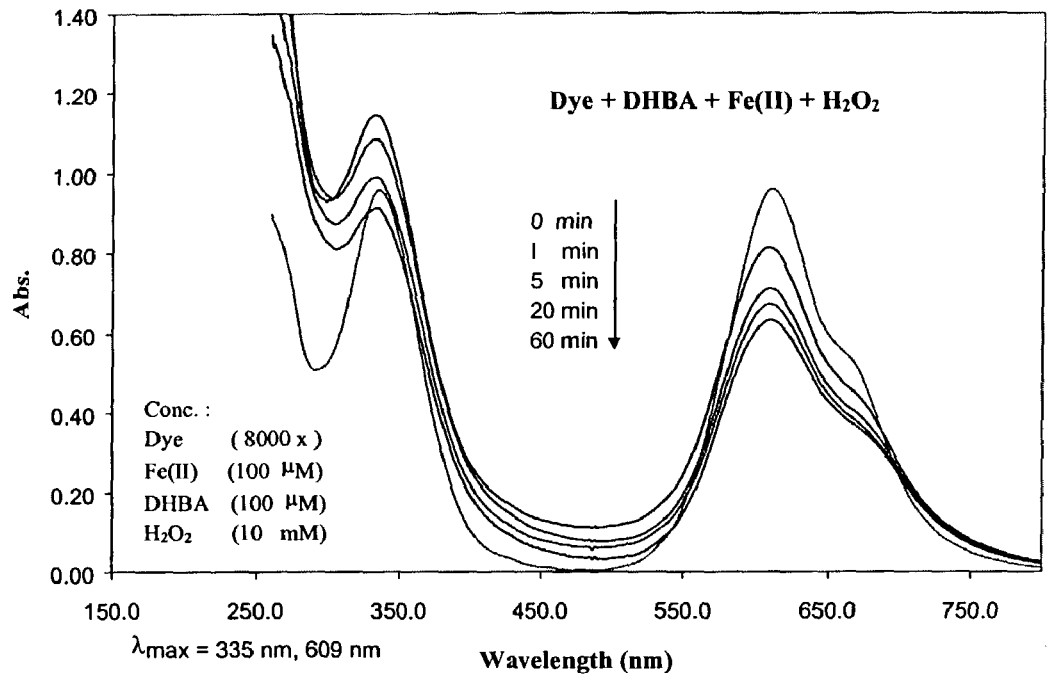
FIG. 15. An UV spectra showing the degradation of CARTASOL BRILLIANT TURQUOISE K-RL liquid dye by Fenton reagent and DHBA chelator.
Figure 16:
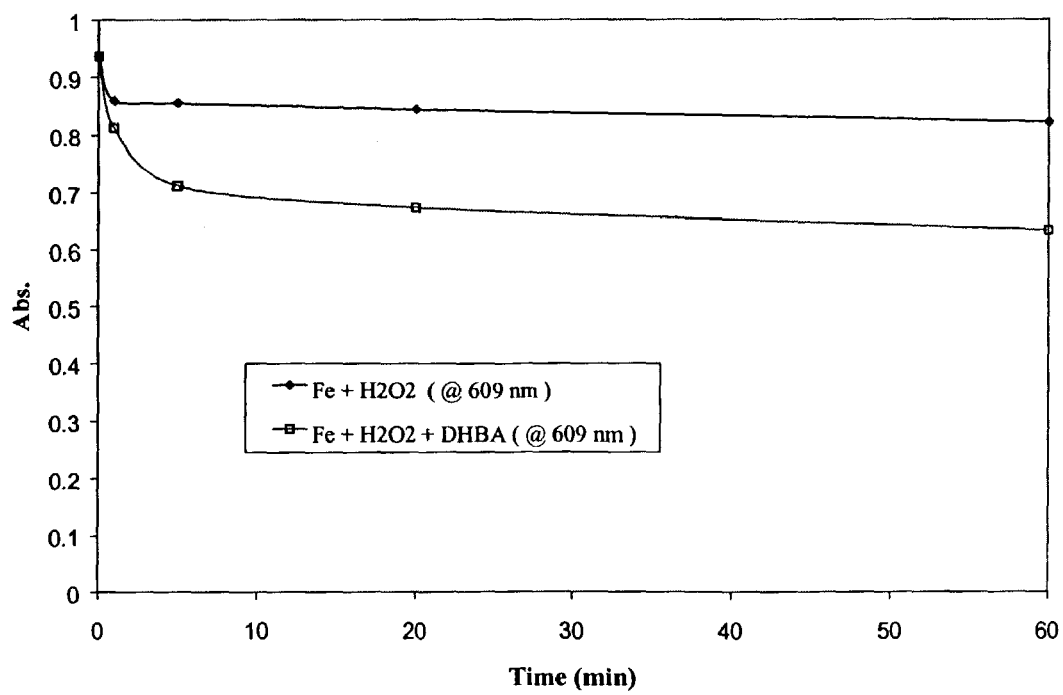
FIG. 16. A comparison of CARTASOL BRILLIANT TURQUOISE K-RL liquid dye degradation by Fenton reagent vs. chelator (DHBA)/Fenton system.

The results of the degradation study of the four dyes is shown in the attached FIGS. 1-16. FIGS. 1 to 4 show degradation of Carta yellow G dye by common Fenton system and redox cycling chelator mediated Fenton system. After 1 minute incubation, both the Fenton system and the DHBA-mediated Fenton system degraded Carta yellow G dye significantly (peak absorbance reduced from 1.3 to about 0.8) (FIG. 2). However, the DHBA-mediated Fenton system has much higher degradation efficiency (FIGS. 2,3,4). After 90 minutes incubation, the sample treated with the redox cycling chelator mediated Fenton system was almost colorless, while the absorbance of the Fenton system control only decreased slightly.

3.4. Conclusions

Hydroxyl radicals, which are generated in the Fenton or mediated Fenton reactions, can rapidly oxidize the diluted dyes tested in this study. The results also show that the degradation process using the redox cycling chelator mediated Fenton system is much more effective than the ordinary Fenton process. In most instances, the organic dyes removal can reach 90% in 10 minutes by chelator mediated Fenton process, whereas it may take ordinary Fenton treatment more than 60 minutes to reach 50% organic dyes removal.

What is claimed is:

1. A method of forming a lignocellulosic material composite article comprising: (a) generating a reactive oxygen species capable of oxidizing a lignocellulosic material by contacting a redox cycling chelator with an oxygen containing oxidant and a transition metal species at a pH of between 1 and 6; (b) contacting said lignocellulosic material with said reactive oxygen species thereby forming an oxidized lignocellulosic material whereby the lignin of the lignocellulosic material forms an adhesive; and (c) after step (b), applying sufficient heat and pressure to said oxidized lignocellulosic material to form said lignocellulosic material composite article.

2. The method according to claim 1 wherein said transition metal species is a member of the group consisting of iron and copper.

3. The method according to claim 1 wherein said redox cycling chelator is a member of the group consisting of hydroquinone, benzoquinone, EDTA, catechol, quinoline, benzoic acid and substituted derivatives thereof.

4. The method according to claim 1 wherein said oxygen containing oxidant is a member of the group consisting of hydrogen peroxide, hydroperoxide, peroxide, ozone, singlet oxygen, and permanganate.

5. The method according to claim 1 wherein said lignocellulosic material composite article is a member of the group consisting of particleboard, fiberboard, oriented strand board, laminated wood products, or plywood.

6. The method according to claim 1 wherein said lignocellulosic material composite article comprises at least one non-lignocellulosic material belonging to the group consisting of fiber reinforced polymers, plastics, metals, glass, organic waste products, inorganic waste products, ceramics, cement, stone products, arbon, aramids, and kevlar.

7. A lignocellulosic material composite article formed by: a) generating a reactive oxygen species capable of oxidizing a lignocellulosic material by contacting a redox cycling chelator with an oxygen containing oxidant and a transition metal species at a pH of between 1 and 6; (b) contacting said lignocellulosic material with said reactive oxygen species thereby forming said oxidized lignocellulosic material whereby the lignin of the lignocellulosic material forms an adhesive; and (c) after step (b), applying sufficient heat and pressure to said oxidized lignocellulosic material to form said lignocellulosic material composite article.

8. The lignocellulosic material composite article according to claim 7 wherein said transition metal is a member of the group consisting essentially of iron and copper.

9. The lignocellulosic material composite article according to claim 7 wherein said redox cycling chelator is a member of the group consisting of hydroquinone, benzoquinone, EDTA, catechol, quinoline, benzoic acid and substituted derivatives thereof.

10. The lignocellulosic material composite article according to claim 7 wherein said oxygen containing oxidant is a member of the group consisting of hydrogen peroxide, hydroperoxide, peroxide, ozone, singlet oxygen, and permanganate.

11. The lignocellulosic material composite article according to claim 7 wherein said lignocellulosic material composite article is particleboard, fiberboard, oriented strand board, laminated wood products, or plywood.

12. The lignocellulosic material composite article according to claim 7 wherein said lignocellulosic material composite article additionally comprises at least one non-lignocellulosic material belonging to the group consisting of fiber reinforced polymers, plastics, metals, glass, organic waste products, inorganic waste products, ceramics, cement, stone products, arbon, aramids, and kevlar.

13. A method of preparing an adhesive formulation comprising: (a) generating a reactive oxygen species capable of oxidizing a phenoxy subunit-containing organic compound by contacting a redox cycling chelator with an oxygen containing oxidant and a transition metal species at a pH of between 1 and 6; and (b) contacting said phenoxy subunit-containing organic compound with said reactive oxygen species thereby preparing said adhesive formulation.

14. The method according to claim 13 wherein said phenoxy subunit-containing organic compound is derived from a plant.

15. The method according to claim 13 wherein said phenoxy subunit-containing organic compound is a lignocellulosic material.

16. An adhesive formulation prepared by: (a) generating a reactive oxygen species capable of oxidizing a phenoxy subunit-containing organic compound by contacting a redox cycling chelator with an oxygen containing oxidant and a transition metal species; and (b) contacting said phenoxy subunit-containing organic compound with said reactive oxygen species thereby preparing said adhesive formulation.

17. The adhesive formulation according to claim 16 wherein said phenoxy subunit-containing organic compound is derived from a plant.

18. The adhesive formulation according to claim 16 wherein said phenoxy subunit-containing organic compound is a lignocellulosic material.

* * * * *